(12) United States Patent
Roth et al.

(10) Patent No.: US 7,609,406 B2
(45) Date of Patent: Oct. 27, 2009

(54) HAND HELD PORTABLE PRINTER WITH RFID READ WRITE CAPABILITY

(75) Inventors: Mark W. Roth, North Miami, FL (US); Donald A. Morrison, Bellbrook, OH (US)

(73) Assignee: Avery Dennison Retail Information Services, LLC, Pasadena, CA (US)

( * ) Notice: Subject to any disclaimer, the term of this patent is extended or adjusted under 35 U.S.C. 154(b) by 606 days.

(21) Appl. No.: 11/383,363

(22) Filed: May 15, 2006

(65) Prior Publication Data

US 2006/0221363 A1    Oct. 5, 2006

Related U.S. Application Data

(63) Continuation-in-part of application No. 10/222,692, filed on Aug. 16, 2002, now Pat. No. 7,180,627.

(51) Int. Cl.
```
G06K 7/10     (2006.01)
G06K 9/22     (2006.01)
G06K 15/02    (2006.01)
H04B 1/10     (2006.01)
H04B 7/00     (2006.01)
```
(52) U.S. Cl. ............... 358/1.15; 340/572.1; 340/5.64; 340/10.1; 340/825.72; 235/462.45; 235/462.46; 235/375; 235/432; 455/41.2; 455/344; 455/272; 455/278.1

(58) Field of Classification Search ............... 358/1.15, 358/1.18, 473, 296; 235/462.45, 462.46, 235/472.01, 476.02, 375, 383, 432, 492, 235/472.02; 340/10.1, 10.3, 825.72, 5.64, 340/5.61, 572.1; 347/109, 222; 455/41.2, 455/41.3, 90.1, 90.2, 90.3, 128, 129, 344, 455/347, 351, 272, 278.1

See application file for complete search history.

(56) References Cited

U.S. PATENT DOCUMENTS

| | | | |
|---|---|---|---|
| 5,483,624 A | 1/1996 | Christopher |
| 5,793,032 A | 8/1998 | Bard |
| 5,804,807 A | 9/1998 | Murrah |
| 6,025,725 A | 2/2000 | Gershenfeld |

(Continued)

FOREIGN PATENT DOCUMENTS

| | | |
|---|---|---|
| DE | 198 46 295 | 4/1999 |
| EP | 0 571 734 | 1/1993 |
| EP | 0 996 084 | 4/2000 |
| EP | 1394718 | 3/2004 |
| JP | 2006-27667 | 2/2006 |

OTHER PUBLICATIONS

SkyeTek, LLC., SkyeTek RFID Readers, SkyeRead M1 Product Information Sheet, 2003.

*Primary Examiner*—Scott A Rogers
(74) *Attorney, Agent, or Firm*—Joseph J. Grass

(57) ABSTRACT

A hand-held portable printer includes a number of input devices mounted in or on a printer housing including a barcode scanner, keypad, communication interface in a receive mode and an RFID read/writer in a read mode. The hand-held portable printer also includes a number of output devices including a printing system, the communication interface in a transmit mode and the RFID read/writer in a write mode for writing to an external RFID chip. A processor selects received data from one or more of the input devices manipulates the data and/or combines it with other data for an output device wherein the data selected for one output device may be different then the data selected for another output device. The hand-held portable printer may utilize both an internal antenna and external antenna. Applying different energy levels to the antennas may determine whether the hand-held portable printer reads from and/or writes to a single RFID chip or a plurality of RFID chips.

42 Claims, 30 Drawing Sheets

U.S. PATENT DOCUMENTS

| | | | |
|---|---|---|---|
| 6,079,619 | A | 6/2000 | Teraura |
| 6,264,106 | B1 * | 7/2001 | Bridgelall .............. 235/462.46 |
| 6,327,972 | B2 | 12/2001 | Heredia |
| 6,409,401 | B1 | 6/2002 | Petteruti |
| 6,467,688 | B1 | 10/2002 | Goldman |
| 6,484,933 | B1 | 11/2002 | Zimmerman |
| 6,761,316 | B2 * | 7/2004 | Bridgelall et al. ...... 235/462.46 |
| 6,775,034 | B1 | 8/2004 | Morford |
| 6,827,279 | B2 * | 12/2004 | Teraura ...................... 235/492 |
| 6,830,181 | B1 * | 12/2004 | Bennett ................. 235/462.46 |
| 6,916,128 | B1 | 7/2005 | Petteruti |
| 6,991,159 | B2 | 1/2006 | Zenou |
| 7,030,761 | B2 * | 4/2006 | Bridgelall et al. ........ 340/572.1 |
| 7,054,595 | B2 * | 5/2006 | Bann ........................ 455/41.2 |
| 7,327,265 | B2 * | 2/2008 | Tsujimura et al. ......... 340/572.7 |
| 7,400,989 | B2 * | 7/2008 | Chapman et al. ........... 340/10.1 |
| 7,429,925 | B2 * | 9/2008 | Sugiyama et al. ......... 340/572.1 |
| 7,432,855 | B2 * | 10/2008 | Mohamadi .................. 342/368 |
| 2001/0045452 | A1 | 11/2001 | Momose |
| 2004/0032443 | A1 | 2/2004 | Moylan |
| 2006/0023251 | A1 | 2/2006 | Petteruti |
| 2006/0071063 | A1 * | 4/2006 | Duckett ..................... 340/10.1 |
| 2006/0125602 | A1 * | 6/2006 | Posamentier et al. ....... 340/10.3 |
| 2006/0214773 | A1 * | 9/2006 | Wagner et al. ............. 340/10.1 |
| 2006/0267733 | A1 * | 11/2006 | Steinke et al. .............. 340/10.1 |
| 2007/0023516 | A1 * | 2/2007 | Chapman et al. ............. 235/432 |
| 2007/0141997 | A1 * | 6/2007 | Wulff et al. ................ 455/41.2 |
| 2007/0194932 | A1 * | 8/2007 | Oishi et al. .............. 340/572.7 |
| 2007/0222609 | A1 * | 9/2007 | Duron et al. ............. 340/572.7 |

\* cited by examiner

HAND HELD PORTABLE PRINTER WITH RFID READ WRITE CAPABILITY

CROSS REFERENCE TO RELATED APPLICATIONS

This application is a continuation-in-part of pending application Ser. No. 10/222,692, filed Aug. 16, 2002, the entire disclosure of which is hereby incorporated by reference.

FIELD OF THE INVENTION

An aspect of the invention is directed to a hand-held portable printer with RFID read/write capabilities (also including an RFID reader-writer) and more particularly to such a hand-held portable printer capable of receiving data via a plurality of input devices mounted in the portable housing and capable of printing selected data, writing selected data to an external RFID chip reading barcode and/or RFID data from an external RFID chip, printing and reading and/or writing to an RFID chip on a web in the hand-held portable printer, and/or uploading selected data to a host.

BACKGROUND

RFID (Radio Frequency Identification) chips have been embedded in tags, labels and the like to track inventory. The data contained in the chip is typically read by a stationary RFID read module as the inventory with the RFID chip is carried past the stationary read module on a conveyor belt or the like. Similarly, stationary RFID write modules are typically used to write data into the RFID chip.

U.S. Pat. No. 6,327,927 shows a stationary printer with an integrated transponder for writing data into a transponder chip embedded in a label and for printing data on the same label. The printer is connected to a computer via a conductor to receive the data to be printed on the label together with data to be written into the chip in the label. In another embodiment, a serial number encoded into the RFID chip in the label is read by the transponder so that the serial number can be printed on the same label. Because this printer is a stationary unit, hard-wired to a computer, its use is very limited. It can only print data received from the computer or read from the chip embedded in the label itself. Moreover, this printer is limited to reading from and writing to RFID chips that pass through the printer housing as opposed to RFID chips that are external to the printer.

Although portable barcode printers with an integrated barcode scanner and capable of communication with a host by a radio frequency transceiver are known, such as shown in U.S. Pat. No. 5,483,624. These printers are not capable of reading data from or writing data to an RFID chip.

The following additional patent documents and other literature are made of record and may or may not be prior art: U.S. Pat. No. 5,483,624; U.S. Pat. No. 5,486,259; U.S. Pat. No. 5,594,838; U.S. Pat. No. 5,793,032; U.S. Pat. No. 6,327,972; U.S. Pat. No. 6,409,401; U.S. Pat. Nos. 6,652,170; 6,761,316; U.S. Pat. No. 6,830,181; U.S. Pat. No. 6,916,128; U.S. Pat. No. 5,804,807; U.S. Pat. No. 6,467,688; U.S. Pat. No. 6,484,933; U.S. Pat. No. 6,775,034; U.S. Pat. No. 6,991,159; U.S. provisional application 60/338,870 filed Dec. 7, 2001; U.S. 2001/0045452; EP 0 571 734 A1; EP 0 996 084 A2; brochure of Alien ALR-9780; brochure of "SkyTech SkyeRead M1;" and DE 198 46 295 A1.

SUMMARY

In accordance with various aspects of the invention, the disadvantages of prior printers as discussed above have been overcome. In an embodiment of the invention, the hand-held portable printer (also including an RFID reader-writer) is capable of receiving data via a plurality of input devices mounted in or on the hand-held portable printer and capable of printing selected data on a label, tag or the like; writing selected data to an external RFID chip; and/or uploading selected data to a host or remote storage location.

More particularly, the hand-held printer includes a portable housing and a plurality of input devices mounted in or on the housing for receiving inputs to the printer. The input devices include a communication interface for receiving data; a plurality of keys actuable by a user and a RFID read/write module in a read mode operable to read data from an external RFID chip. A plurality of data output devices are also mounted in the portable housing. The output devices include a printing system having a printhead and a drive mechanism to drive a web of record members past the printhead for printing data on a record member. The communication interface in a transmit mode and the RFID read/write module in a write mode for writing data to an external RFID chip are also output devices mounted in the portable housing. A processor is mounted in the housing and operable to select data from one or more of the plurality of input devices for printing and coupling the selected print data to the printing system. The processor is also operable to select data from one or more of the plurality of output devices for writing and coupling the selected write data to the RFID read/write module for writing to an external RFID chip.

In accordance with an embodiment of the invention, the communication interface of the hand-held portable printer includes a radio transceiver and/or one or more communication ports. Further, the hand-held portable printer may include a barcode scanner as another input device. The barcode scanner may be mounted in the portable housing or coupled to the hand-held portable printer via the communication interface.

The following specific embodiments of the invention are disclosed:

A hand-held portable printer comprising a portable housing; a plurality of input devices mounted in the housing for receiving data including a barcode scanner, a plurality of keys actuable by a user to provide inputs, a communication interface receiving data downloaded to the hand-held portable printer, and a RFID read/write module in a read mode, a plurality of output devices mounted in the housing including a printing system having a printhead and a drive mechanism to drive a web of record members past the printhead for printing data thereon, the communication interface sending data out from the hand-held portable printer and the RFID read/write module in a write mode, and a processor mounted in the housing, the processor being operable to select data from a plurality of input sources for printing and coupling the selected print data to the printing system and the processor being operable to independently select data from one or more of the input devices for writing and coupling the selected write data to the RFID module for writing, including a memory for storing an application program according to which the processor operates, the application program determining the data selected for printing and the data selected for writing by the RFID module, wherein at least one of the keys is actuable by a user to enter data to the hand-held portable printer, wherein at least one of the keys is actuable by a user to provide an input to the barcode printer to initiate an operation of the hand-held portable printer, including a display mounted on the portable housing, wherein the processor controls the display to prompt a user to actuate a key to initiate an operation of the hand-held portable printer, including a memory for storing data received from a plurality of the input devices in association with a transaction in a transaction record, the processor sending the transaction record to a host via the communication interface, wherein the hand-held portable printer communicates with the host in real time, wherein the memory stores a plurality of transaction records and the processor sends a plurality of the stored transaction records to a host together via the communication interface, wherein the communication interface includes a radio frequency transceiver, wherein the communication interface includes a RS232 port, and wherein the communication interface includes a parallel port, and wherein the communication interface includes a serial port.

A hand-held portable printer comprising a portable housing, a radio transceiver for receiving and transmitting data mounted in the housing, a barcode scanner mounted in the housing for providing scanned barcode data, a printing system mounted in the housing, the printer including a printhead and drive mechanism to drive a web of record members past the printhead for printing data on the record members, an RFID read/write module mounted in the housing, the RFID module in accordance with a read operation providing data read from an external RFID chip and the RFID module in accordance with a write operation writing data to an external RFID chip, a plurality of keys mounted on the housing to provide user inputs to the barcode printer, a memory for storing an application program, and a processor operable in accordance with an application program to take data input from one or more of the radio transceiver, keys, barcode scanner and RFID module and to selectively couple data to the printing system for printing, the RFID module for writing to an external RFID chip and/or the transceiver for transmitting the data, including a display mounted on the portable housing, wherein the processor controls the display to prompt a user to actuate a key to initiate an operation of the hand-held portable printer, wherein at least one of the keys is operable by a user to provide an input to the barcode printer to initiate an operation of the hand-held portable printer, wherein the processor controls the transceiver to provide real time communications between a host and the hand-held portable printer, including at least one communication port for receiving a cable to couple the hand-held portable printer to a peripheral device to receive data therefrom and/or to send data thereto.

A hand-held portable printer comprising a portable housing, a plurality of input devices mounted in the housing for receiving inputs including a communication interface for receiving data, a plurality of keys actuable by a user, and a RFID read/write module in a read mode for reading data from an external RFID chip, a plurality of data output devices mounted in the housing including a printing system having a printhead and a drive mechanism to drive a web of record members past the printhead for printing data on the record members, the communication interface for transmitting data and the RFID read/write module in a write mode for writing data to an external RFID chip, and a processor mounted in the housing and operable to select data from one or more of the plurality of input devices for printing and coupling the selected print data to the printing system and the processor operable to select data from one or more of the plurality of input devices for writing and coupling the selected write data to the RFID read/write module for writing to an external RFID chip, wherein the communication interface includes a radio transceiver, wherein the communication interface includes a communication port, wherein the communication port is a serial port, wherein the communication port is a parallel port, wherein the communication port is a RS232 port, wherein the communication interface includes a radio transceiver and a communication port, wherein at least one of the keys is actuable by a user to enter data to be printed or written, wherein the plurality of keys are actuable by a user to select a plurality of operations of the hand-held portable printer, wherein at least one of the keys is actuable by a user to initiate an operation of the hand-held portable printer, including a memory for storing an application program according to which the processor operates, the application program determining the data selected for printing and the data selected for writing by the RFID module, including a memory for storing information representing the data received, printed and/or written in association with a transaction in a transaction record, and wherein said memory stores a plurality of transaction records.

A hand-held portable printer comprising a portable housing, a plurality of input devices mounted in the portable housing including a RFID read/write module in a read mode, a plurality of output devices mounted in the portable housing including a read/write module in a write mode, a display and a printhead for printing, a memory storing an application program, and a processor for processing input data in accordance with the application program, the processor selectively coupling processed data to one or more of the output devices, wherein said processing includes combining data read via the RFID module with stored data for printing, and wherein said processing includes converting data read via the RFID module to human readable information for display and/or printing.

A portable data tracking device comprising a portable housing with a handle, a barcode scanner mounted in the housing, a communication interface mounted in the housing to allow communications between the device and a host, an RFID read/write module mounted in the housing for reading from and writing to an external RFID chip, a display mounted in the housing, a memory mounted in the housing storing an application program, and a processor mounted in the housing for processing data received by the barcode scanner, communication interface and/or RFID read/write module and providing output data to the communication interface RFID read/write module and/or display in accordance with the stored application program, including a printing system with a printhead and a motor for driving a web of record members past the printhead, the processor providing output data to the printing system for printing, and including a keypad to which the processor is responsive.

A computer-readable medium containing computer-executable instructions for causing a hand-held portable RFID reader-writer to perform the steps includes: receiving a read command from a user, the read command indicating whether the read is for a single RFID chip or a plurality of RFID chips located outside of the hand-held portable RFID printer; when the read command is for said single RFID chip, generating an RFID read signal having a first energy level; and when the read command is for said plurality of RFID chips, generating an RFID read signal having a second energy level that is greater than the first energy level. Computer-executable instructions may also be included in order to cause the hand-held portable RFID reader-writer to perform the steps of: receiving a write command from a user, the write command indicating whether the write is for a single RFID chip or a plurality of RFID chips located outside of the hand-held portable RFID printer; when the write command is for said single RFID chip, generating an RFID write signal having a first energy level; and when the write command is for said plurality of RFID chips, generating an RFID write signal having a second energy level that is greater than the first energy level. Computer-executable instructions may also be included in order to cause the hand-held portable RFID printer to perform the step of printing and or RFID encoding data on a label.

A method of printing labels includes the steps of: (a) receiving a read command at a hand-held portable printer including a housing, a barcode scanner, and an RFID reader/writer on the housing that generates read and/or write signals; (b) in response to reading RFID chip external data from at least one RFID chip located outside of the housing; transmitting to a remote host computer system at least a portion of the read RFID chip external data; associating additional data received from the host computer system with the read RFID chip external data to form updated data; and writing to an internal RFID chip in a label the updated data.

In one embodiment, the hand-held portable printer can utilize an internal antenna to read from and/or write to a single RFID chip embedded in label in a web of record members. The hand-held portable printer can utilize an external antenna to read from and/or write to RFID chips external to the device. Varying the amount of energy applied to the external antenna allows the user to read from and/or write to a single RFID chip (e.g., at a lower energy level) or multiple RFID chips (e.g., at a higher energy level).

The hand-held portable printer of the present invention is extremely flexible and allows a user to easily accomplish barcode and RFID tracking, data collection, printing and RFID reading and/or writing onto a web of record members with one portable device. Moreover, the hand-held portable printer allows a user to carry out new tracking functions that have heretofore not been possible as discussed in detail below.

BRIEF DESCRIPTION OF THE DRAWINGS

These and other advantages and novel features of the present invention, as well as details of an illustrated embodiment thereof, will be more fully understood from the following description and drawings.

FIG. 16-1 is a continued flow diagram of FIG. 16 showing RFID record members generated in one or both of a hand-held printer and a remote printer in accordance with an aspect of the invention.

DETAILED DESCRIPTION

Figure 1:
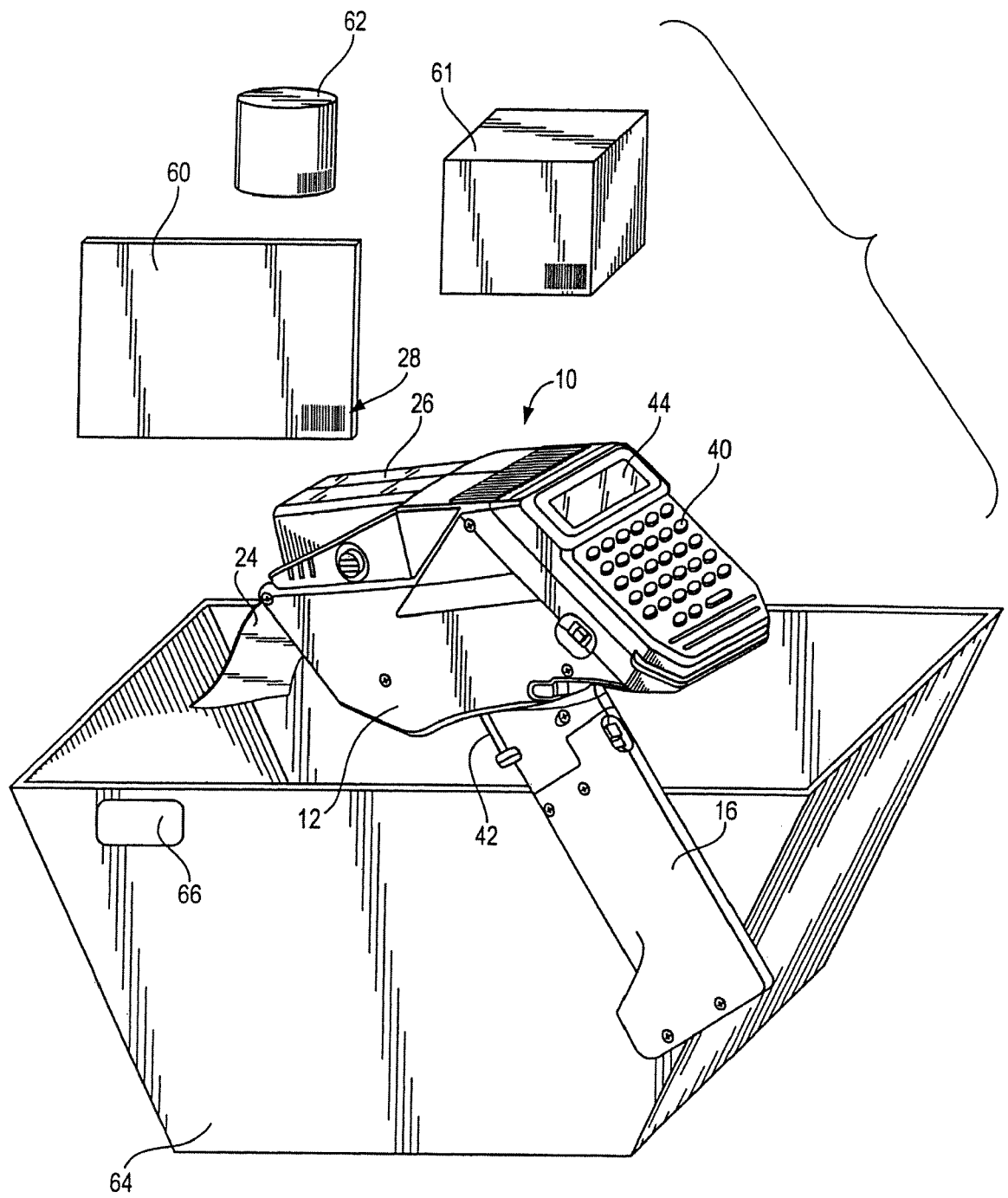
FIG. 1 is a perspective view of the hand-held portable printer in accordance with an aspect of the invention utilized to track items to be carried in a container having a RFID chip mounted thereon.
Figure 2:
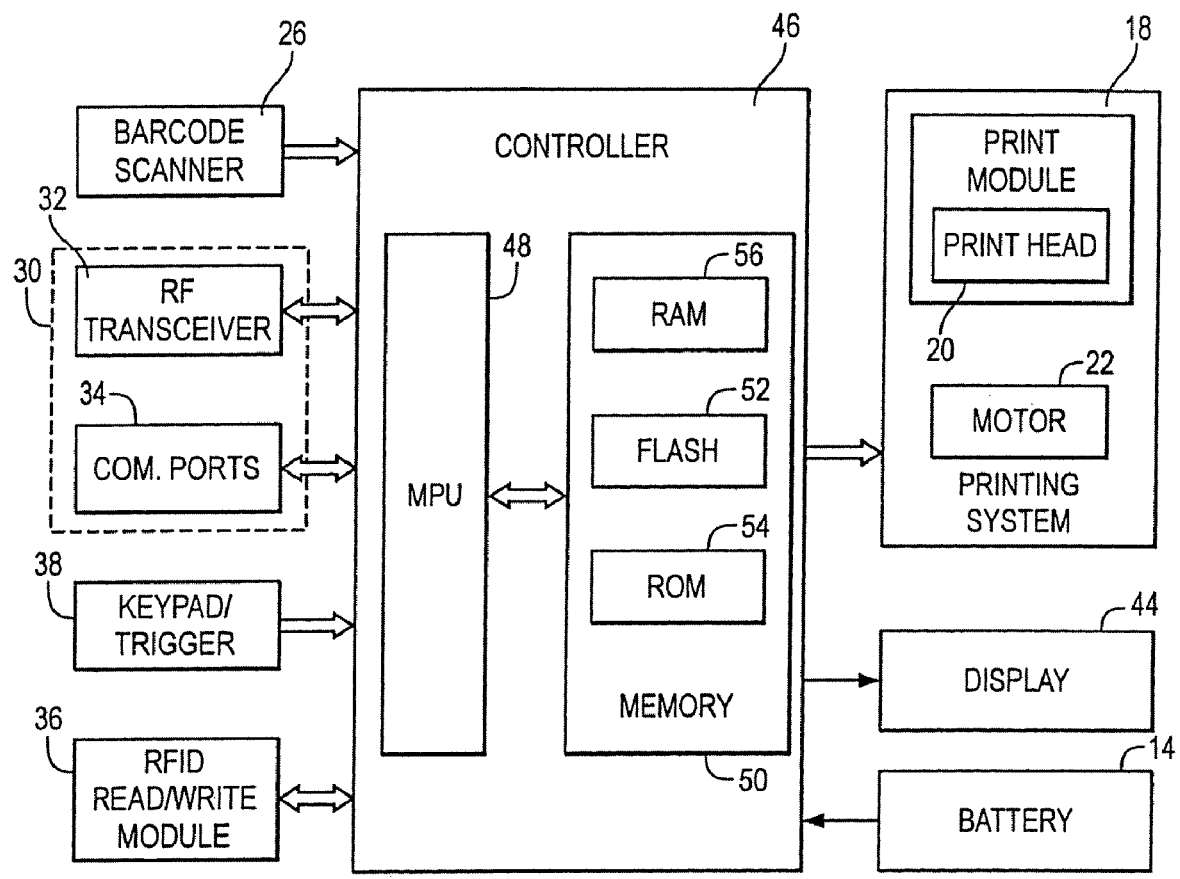
FIG. 2 is a block diagram of the hand-held portable printer of FIG. 1 in accordance with an aspect of the invention.

The hand-held portable printer 10 as shown in FIGS. 1 and 2 includes a portable housing 12. A battery 14 is mounted in a handle 16 of the housing 12 to provide power to the hand-held portable printer 10. The hand-held portable printer 10 includes a printing system 18 with a printhead such as a thermal printhead 20 or the like. The printing system 18 also includes a motor 22 that drives a web of record members 24, such as labels, tags, etc. via one or more rollers (not shown) past the printhead 20 in order to print data thereon. The data printed by the printhead 20 includes a barcode and/or alphanumeric information.

The hand-held portable printer 10 includes a number of input devices mounted in the housing 12. One such input device is a barcode scanner 26 that is actuable to scan a barcode 28 to provide scanned barcode data to the printer 10. The input devices also include a communication interface 30. In an embodiment, the communication interface 30 includes a radio frequency transceiver 32 and/or one or more communication ports 34 such as a RS 232 port, a serial port, USB port, firewire port, an infrared port, a parallel port, etc. The communication interface 30 allows the hand-held portable printer 10 to communicate with a host device to receive data therefrom or to transmit transaction data thereto. The communication interface 30 allows the hand-held portable printer 10 to communicate with the host in real time. Alternatively, the hand-held portable printer 10 may be operated off-line such that the data received from a host is stored in a look-up table or the like in a memory of the printer for later use. Similarly, data may be entered via one or more of the input devices stored in a memory of the printer and later transmitted with a batch of data records to a host via a communication port 34. In another embodiment of the printer 10, the barcode scanner 26 is not mounted in the housing 12 but is coupled thereto via the communication interface 30 via either RF communications or via a cable coupled to a communication port 34.

A RFID read/write module 36 is mounted in the housing 12 of the hand-held portable printer 10. Although the RFID read/write module 36 is capable of reading and/or writing to a RFID chip embedded in a record member that is driven by the motor 22 internal to the housing 12, in an embodiment, the RFID read/write module 36 reads data and/or writes data to an RFID chip that is external to the hand-held portable printer 10 as will be apparent from the applications discussed below. When operating in the read mode, the RFID read/write module forms one of the data input devices for the hand-held portable printer 10. In a write mode, the RFID read/write module 36 forms one of the output devices along with the printing system 18 and the communication interface 30 when transmitting or sending data out from the printer 10.

In an embodiment, the hand-held portable printer 10 includes a plurality of keys 38 including a keypad 40 and a trigger key 42. The keypad 40 may be utilized to enter alphanumeric data to the hand-held portable printer 10. Alternatively, the keypad 40 may have only a limited number of keys that are actuable in accordance with information depicted on a display 44 for selecting a number of operations of the printer, for example, feeding a web of record members through the printer 10, displaying status information, etc. The trigger key 42 may be actuable by a user in various modes of the hand-held portable printer 10 to actuate the barcode scanner 26, the printing system 18 and/or the RFID read/write module 36. Alternatively, one or more of these devices may be actuated automatically by a controller 46 of the barcode printer 10 in accordance with a stored application program. In addition to displaying status information or data entered via the keyboard, the display 44 may also be controlled to provide prompts to the user to actuate the trigger key and/or other keys so as to control various operations of the hand-held portable printer 10.

The hand-held portable printer 10 includes a microprocessor 48 and a memory 50. The memory 50 includes non-volatile memory such as flash memory 52 and/or a ROM 54 such as the EEPROM. Any other type of memory (not shown) may be used as well including, for example, PROM or EPROM, The memory 50 also includes a RAM 56 for storing and manipulating data. In accordance with an embodiment of the invention, the microprocessor 48 controls the operations of the hand-held portable printer 10 in accordance with an application program that is stored in the flash memory 52. The microprocessor 48 may operate directly in accordance with the application program. Alternatively, the microprocessor 48 may operate indirectly in accordance with the application program as interpreted by an interpreter program stored in the memory 50 or another area of the flash memory 52.

The microprocessor 48 is operable to select an input device 26, 32, 34, 38 and 36 to receive data therefrom and to manipulate the receive data and/or combine it with data received from a different input source 26, 32, 34, 38 or 36 in accordance with a stored application program. The microprocessor couples the selected, combined and/or manipulated data to the printing system 18 for printing on a record member. The microprocessor may select the same or different data to be written to an external RFID chip. The microprocessor couples the data selected for writing to the RFID read/write module 36 wherein the data is written in encoded form to the external RFID chip. Similarly, the microprocessor 48 may select the same or different data for storage in a transaction record in the RAM 56 and for uploading via the communication interface 30 to a host. The processor 48 is operable to select data to be coupled to the printing system 18 independently of the data that the processor 48 selects to be coupled to the RFID read/write module 36 to provide greater flexibility than has heretofore been possible.

The hand-held portable printer 10 may be used for a number of applications. For example, the hand-held portable printer 10 may be used to track items 60, 61, 62, etc. that are packed or carried in a container 64 having a RFID chip 66 mounted thereon. In accordance with this application, the hand-held portable printer 10 may be operated by the microprocessor 48 to first display a message on the display 44 prompting the user to enter a product code. In response to this displayed message the user would actuate the trigger 42 to operate the barcode scanner 26 to scan a barcode 28 on an item 60 to be placed into the container 64. Alternatively, the user could enter the product code via the keypad 40. Once the scanned or keyed in product code information is received by the hand-held portable printer 10, the microprocessor 48 sends a message via the RF transceiver 32 to a host computer or the like to obtain other data associated with the product code that was scanned or keyed in. The information received from the host via the radio transceiver 32 may include, for example, price, supplier code, date information etc. Upon receiving the additional product information from the host, the microprocessor 48 controls the RFID read/write module 36 to read data encoded in the RFID chip 66 mounted on the container 64. The information included in the RFID chip may be a container ID for example. Upon receiving the information read from the RFID chip 66, the microprocessor 48 assembles a transaction record that includes the container ID read from the RFID chip 66, the product ID scanned by the barcode scanner 26 or keyed via the keypad 40 along with the price and other product information received from the host. The transaction record is stored in the RAM 56. The microprocessor 48 selects data, for example the scanned or keyed in product ID, along with the price and product description received from the host via the RF transceiver 32 for printing and couples the selected data to the printing system 18 to print the data on a label 24. The label then may be affixed to the item 60. Next, the microprocessor 48 selects received data, for example the product code of item 60, to be written to the external RFID chip 66. The microprocessor 48 couples the selected data to the RFID read/write module 36 to write selected data to the RFID chip 66. The barcode printer 10 may similarly process each of the additional items put into the container 64 such as the item 61 and the item 62. As the items are processed by the hand-held portable printer 10, labels are printed for each of the items and the RFID chip 66 is updated to add the product code for each item 61, 62. The hand-held portable printer 10 may upload an individual transaction record to the host via the RF transceiver 32 as each item is processed by the printer 10. Alternatively, the printer 10 may store a number of transaction records each associated with an individual product and at a later time upload to the host all of the transaction records in association with the container 64 identification read from the chip 66 via the transceiver 32 or communication port 34. Similarly, the printer 10 may print a packing label for the container 64 listing all of the items contained therein and the associated information. Because the data printed on the label 24, the data written to the RFID chip 66 and the data uploaded to the host computer are used for different purposes, the printer 10 may select different data from the different data input devices to be coupled to the respective printing system RFID read/write module and communication interface 30 as is desired.

In another application, the hand-held portable printer 10 may be used by a retail clerk to process the sale of clothes or other items. In this application, when an item is sold, the hand-held portable printer 10 is operated such that the microprocessor 48 controls the scanner 26 to scan a barcode on a tag affixed to the clothing. Upon receipt of the scanned barcode, the microprocessor 48 retrieves from a host computer via the communication interface 30 or from a user via the keys 40, a markdown price, for example. In response to the receipt of the markdown price, the microprocessor 48 couples the price data to the printing system 18 to print a markdown price label which is affixed to the tag. The printer 10 then selects and couples the current date of the sale and the markdown price to the RFID read/write module 36 to cause the module 36 to write the data to an RFID chip contained in a woven label that is sewn to the clothing. The microprocessor 48 also stores a record of the transaction for uploading to the host computer.

Later if the clothing is returned, the RFID chip embedded in the woven label tag may be read by the hand-held portable printer 10 to determine the date of the sale, the price, etc. The hand-held portable printer 10 then couples a code indicating that this is a returned item to the RFID read/write module 36 to write the code to the RFID tag affixed to the clothing. In this manner, returned clothing may be tracked for inventory and/or additional price markdowns if desired.

A further application may prevent theft from a retailer where an individual tries to return to a store an item that was never purchased. In this application, the hand-held portable printer 10 is used at a checkout station to scan a barcode on a tag or label carried on an item that is being purchased. The item identification from the scanned barcode is sent by the microprocessor 48 via a communication port to a host. Once the item is paid for, the printer 10 receives a transaction complete message from the host. Upon receipt of the transaction complete message, the microprocessor 48 controls the read/write module to write a code to an RFID chip carried on the product designating that the product was purchased and/or the date of the sale. If an item is returned for cash, the printer 10 may read the RFID tag to determine if the item was actually purchased, i.e. paid for. Moreover, a stationary RFID reader may be placed near the exit to a store to read the RFID tag on items as they pass by. If a RFID chip is read without the code indicating that the item was paid for, an alarm can sound.

Because the printer 10 may be operated in an off-line or stand alone mode, if the host or communication network goes down, the printer 10 may read information from an RFID tag via the RFID read/write module 36. The read data may be displayed by the microprocessor 48 on the display 44 and/or printed. The read data may then be used by the microprocessor to lookup information associated with the read data that is stored in the RAM 56 which may be a battery-backed RAM or in the flash memory 56. The read data and stored data may then be combined by the microprocessor 48 for printing by the printing system 18.

These are just a few examples illustrating the flexibility of the hand-held portable printer 10 of the present invention. Many more are possible. Many modifications and variations of the present invention are possible in light of the above teachings. Thus, it is to be understood that, within the scope of the appended claims, the invention may be practiced otherwise than as described hereinabove.

Figure 3:
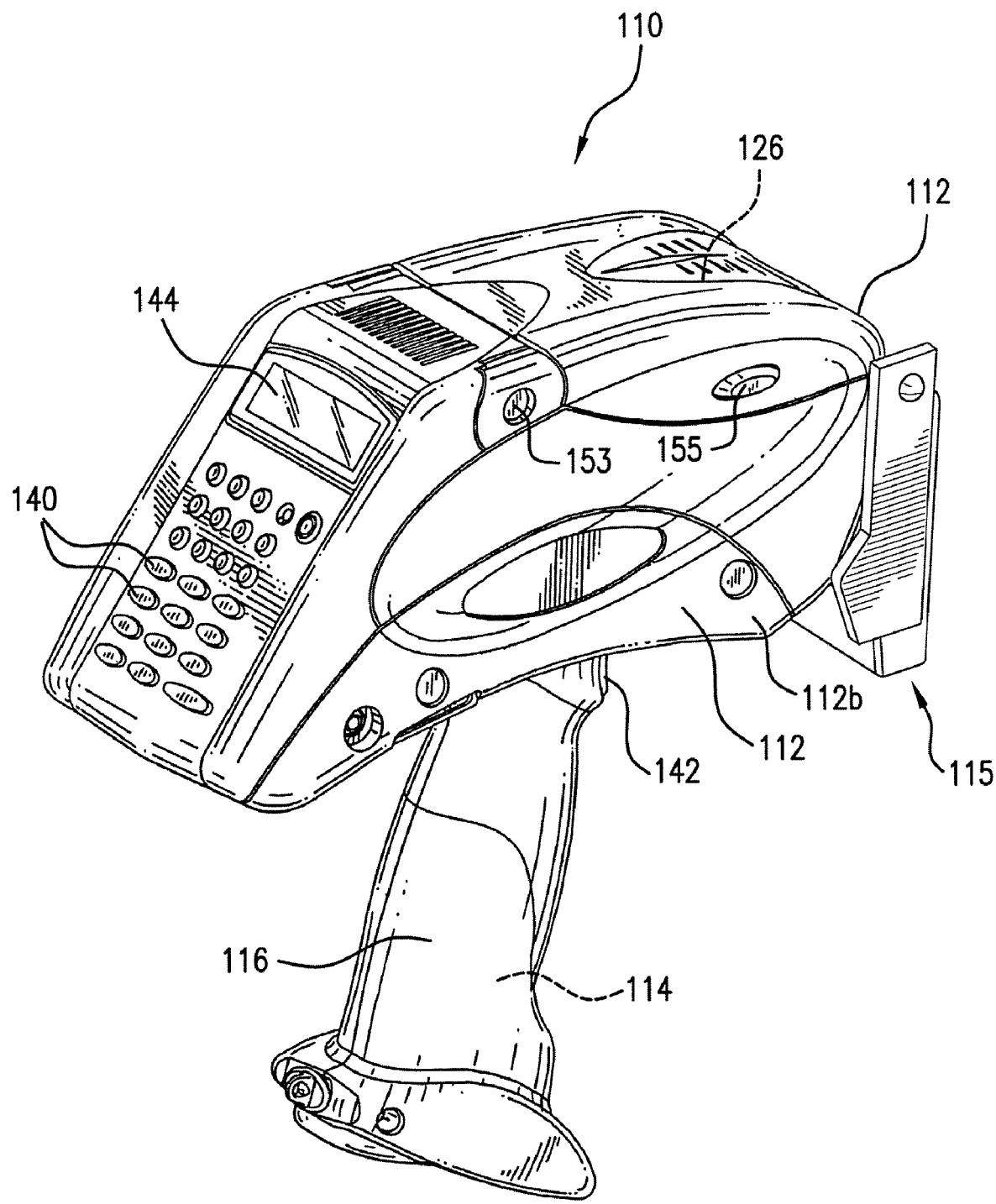
FIG. 3 is a perspective view of another embodiment of the hand-held portable printer in accordance with an aspect of the invention.

With reference initially to FIG. 3, the embodiment of handheld, portable printer 110 is the same as the embodiment of the printer 10 in construction and function except as disclosed in FIGS. 3 through 14 and described hereinafter. Components of the printer 110 which are the same or substantially the same as composite of the printer 10 of the embodiment of FIGS. 1 and 2 have the same reference characters increased by "100". As with the printer 10, the printer 110 includes a hand-held, portable housing or frame 112 having a handle 116. The printer 110, as well as the printer 10, are hand-held so they may be used while they are being carried or maneuvered to read a barcode or an RFID chip or chips, while printing and while applying labels. This is in contrast to a printer which is intended to be positioned on a table or desk during use. In the embodiment of FIGS. 3 through 14, the handle 116 contains a battery 114 for powering the printer 110. A keyboard or key pad 140 on the housing may be utilized to enter alphanumeric data to the printer 110 and also to control certain functions. For example, one or more keys of the keypad are actuatable for selecting a number of operations of the printer 110, as feeding a web W of record members through the printer, selecting energy levels for an antenna generally indicated at 115, displaying status information, etc. The printer also has a display 144. A trigger or trigger key 142 disposed at the handle 116 is actuatable by a user in various modes of the printer 110 to actuate a barcode scanner 126 on the housing 112, a printing system 118 and/or an RFID reader-writer 136. The terms RFID module and RFID reader/writer refer to the structure and/or software to read and/or write data to an RFID chip or transponder. Whether referred to herein as a RFID reader/writer or an RFID read/write module, the structure and software may be in a miniature device or it may be incorporated into the printer electronics and software.

Figure 4:
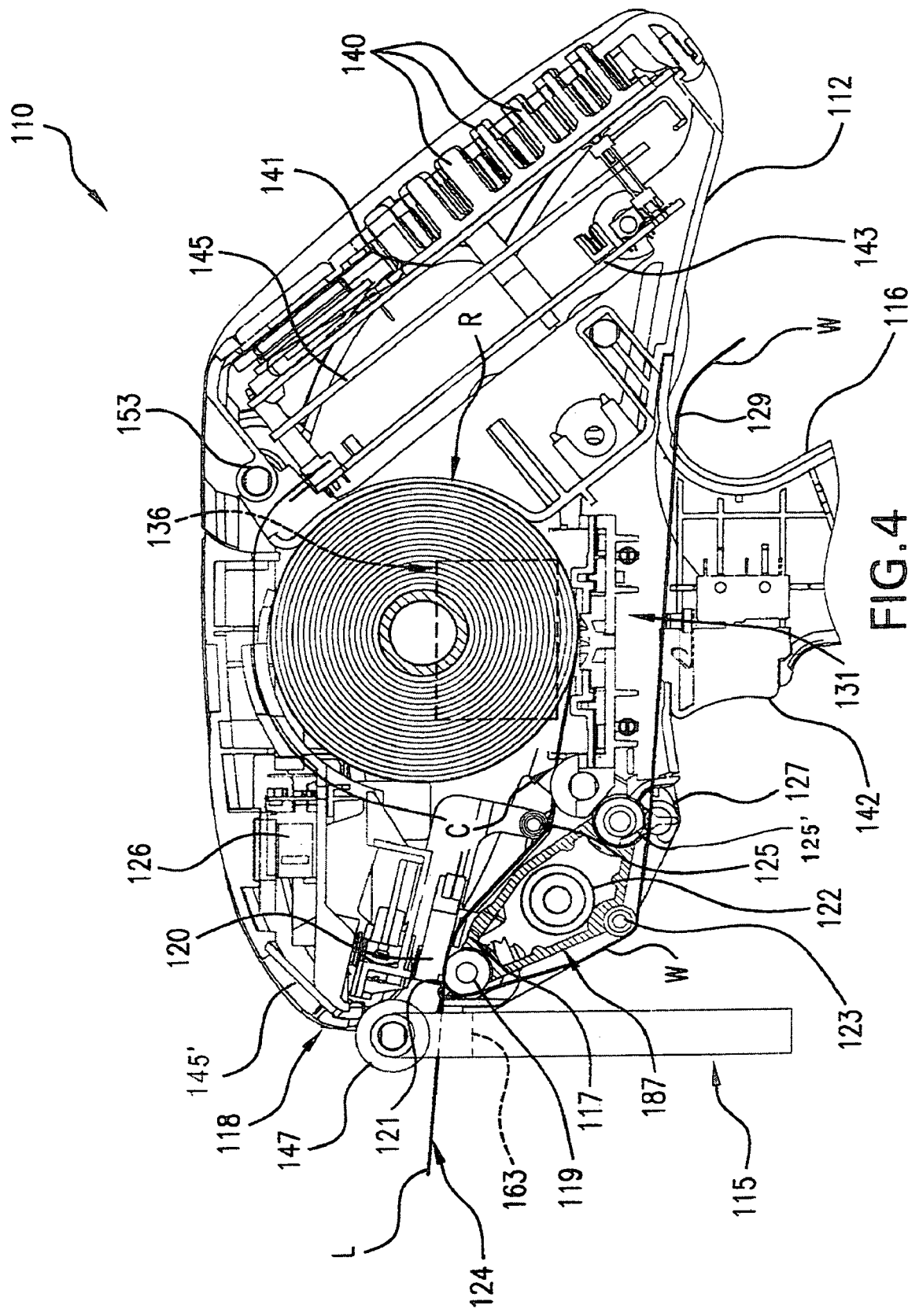
FIG. 4 is a fragmentary sectional view through the printer of the embodiment of FIG. 3 in accordance with an aspect of the invention.

With reference to FIG. 4, the printer 110 is shown partly in section. The printer 110 mounts a roll R of a composite web C of record members 124, in particular pressure sensitive RFID labels L releasably adhered to a carrier web W. The composite web C passes from the roll R beneath a roller 125, and over an antenna 117. The antenna 117 is immediately upstream of a platen roll 119. The printhead 120, the platen roll 119, the motor 122 and gearing (not shown) comprise parts of the printing system 118. The print head 120 cooperates with the platen roll 119 as the motor 122 drives the platen roll 119 to print on the labels L. The driven platen roll 119 advances the carrier web W during printing. The platen roll 119 advances the composite web C to and beyond the platen roll 119 to the delaminator 121. As the carrier web W makes a sharp bend about delaminator or peel roller 121, a label L projects from the front of the printer 110. The carrier web W passes from there to and partially around a direction-changing roll 123, from there the carrier web W passes between a feed roll 125' and a back-up roll 127, and from there the carrier web W passes out of the printer through an exit opening 129. The roll R is shown mounted on a label roll holder 131, a portion of which is shown in FIG. 4. The RFID reader/writer 136 is electrically connected to the antenna 117. In an aspect of the invention, each label L contains an RFID chip or transponder so that such RFID labels L may be written to and read one-by-one by the RFID reader/writer.

A subframe or mounting section 187 shown in black in FIG. 4 helps mount the motor 122. The equivalent of the subframe 187 is disclosed at 87 in U.S. Pat. No. 5,486,259. The subframe 187 is composed of electrically conductive plastics material and constitutes a shield which is grounded to the user through the electrically conductive trigger 142. Electrostatic charges are grounded to the user as in U.S. Pat. No. 4,980,009, the disclosure of which is incorporated herein by reference. The subframe 187 shields the antenna 117 and the antenna 115 from each other.

As in published U.S. Patent application US2005/0280537A1, the disclosure of which is incorporated herein by reference, the printer 110 may print on RFID labels L in the composite web C and encode and decode, that is, write data to the RFID chip in the label L and immediately thereafter read the encoded data. The RFID reader/writer 136 first writes to the RFID chip on the label L which is immediately ahead of the print head 120 and upon completion of the writing, reads the RFID chip in the label L. If the reading of the RFID chip is successful, the label L is advanced and is printed on by the print head 120 while the label L is advancing. Thus, writing to and reading from the RFID chip on or in the composite web C of record members, in this case, labels L, occurs prior to printing alphanumeric and/or bar codes on the labels L. If the encoded label L cannot be read, the printer 110 prints an overstrike or cancellation symbol on that label L.

The keypad 140 is mounted at the rear of the printer and includes a keyboard printed circuit board 141. Spaced parallel to the printed circuit board 141 is the printer printed circuit board 143, and between the printed circuit boards 141 and 143 is a radio card 145 of the radio to be described hereinafter.

The barcode scanner 126 may read a barcode, e.g. the barcode 28 (FIG. 1) through a window 145'. The scanner 126 also emits a beam such as a laser beam so that the printer 110 may be aimed at the barcode 28 or an RFID label 66.

When the leading label L is dispensed beyond and downstream of the peel roller 121, the leading label L is presented in label applying relationship to an applicator roll 147 as shown in FIG. 4. The label L may then be applied to a product by rolling it onto the product using the applicator roll 147. Therefore, while the printer 110 prints and dispenses labels L, the printer 110 is also a labeler which may apply labels L to a product, and accordingly, the printer 110 is considered to be a labeler as well.

Since various features of the printer 110 are the same as disclosed in U.S. Pat. No. 5,486,259, the disclosure of which is incorporated herein by reference.

Figure 5:
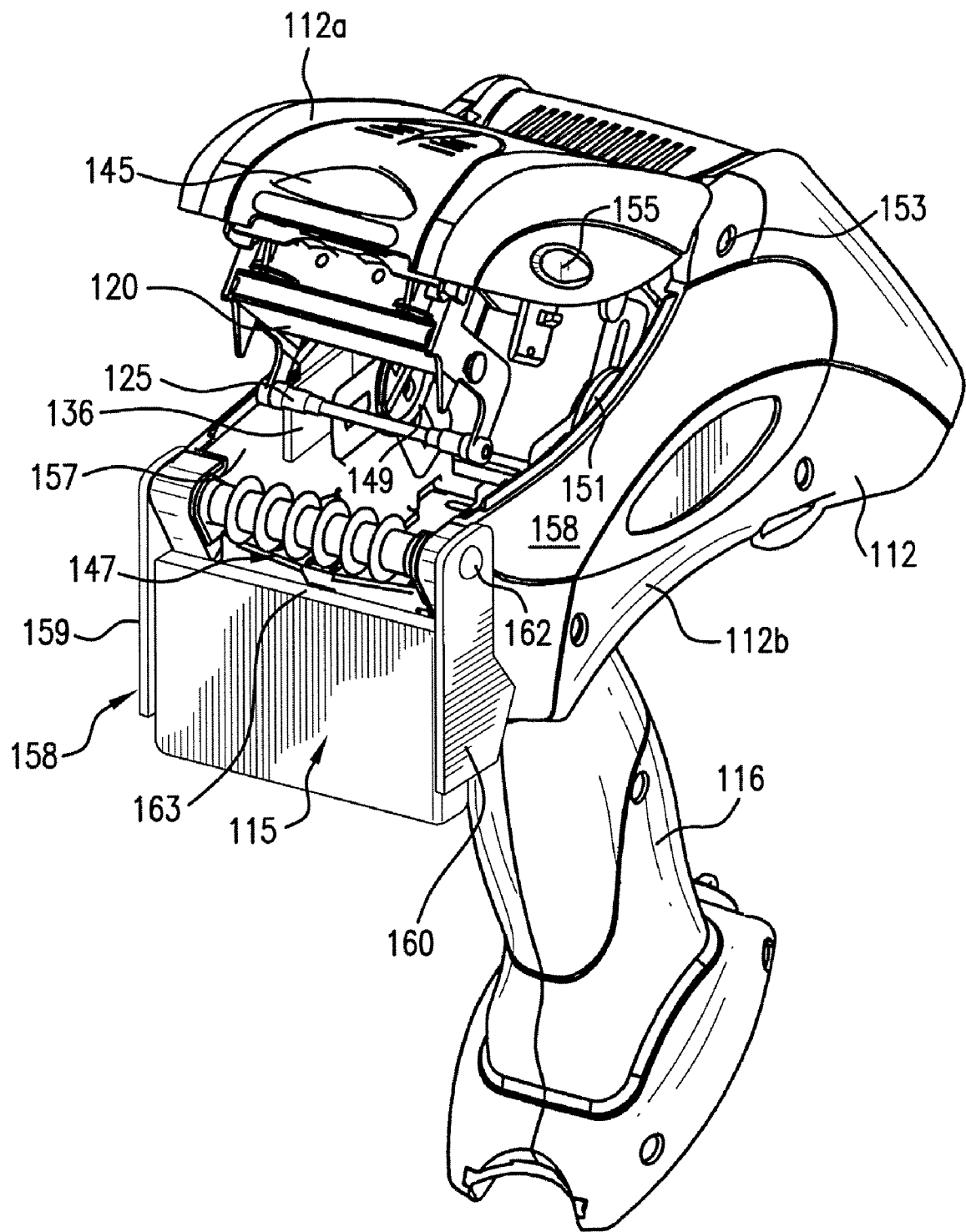
FIG. 5 is a perspective view of the printer shown in its open position and showing a printed circuit board which comprises the RFID read/writer in accordance with an aspect of the invention.

FIG. 5 shows the printer 110 with its upper housing or frame section 112a and its lower housing or frame section 112b pivotal relatively apart. As such, a label roll R may be inserted into the inside of the housing or frame 112 and positioned on label roll holders 149 and 151, as in U.S. Pat. No. 5,486,259. The carrier web W may be threaded through the printer 110 as explained above and the housing section 112a moved to the closed portion shown in FIGS. 3 and 4. The housing section 112a is pivotable about a pin 153 and latched by a latch 155. As shown in FIG. 5, the RFID reader/writer 136 is situated between housing side walls 157 and 158. In particular, the RFID reader/writer 136 is positioned against the side wall 157 and is suitably adhered thereto; the RFID reader/writer 136 is positioned between the holder member 149 and the side wall 157. If desired, the RF reader/writer 136 may be positioned between the printed circuit board 141 and the printed circuit board 145, or the RFID reader/writer may be incorporated into the printer printed circuit board 143.

Figure 6:
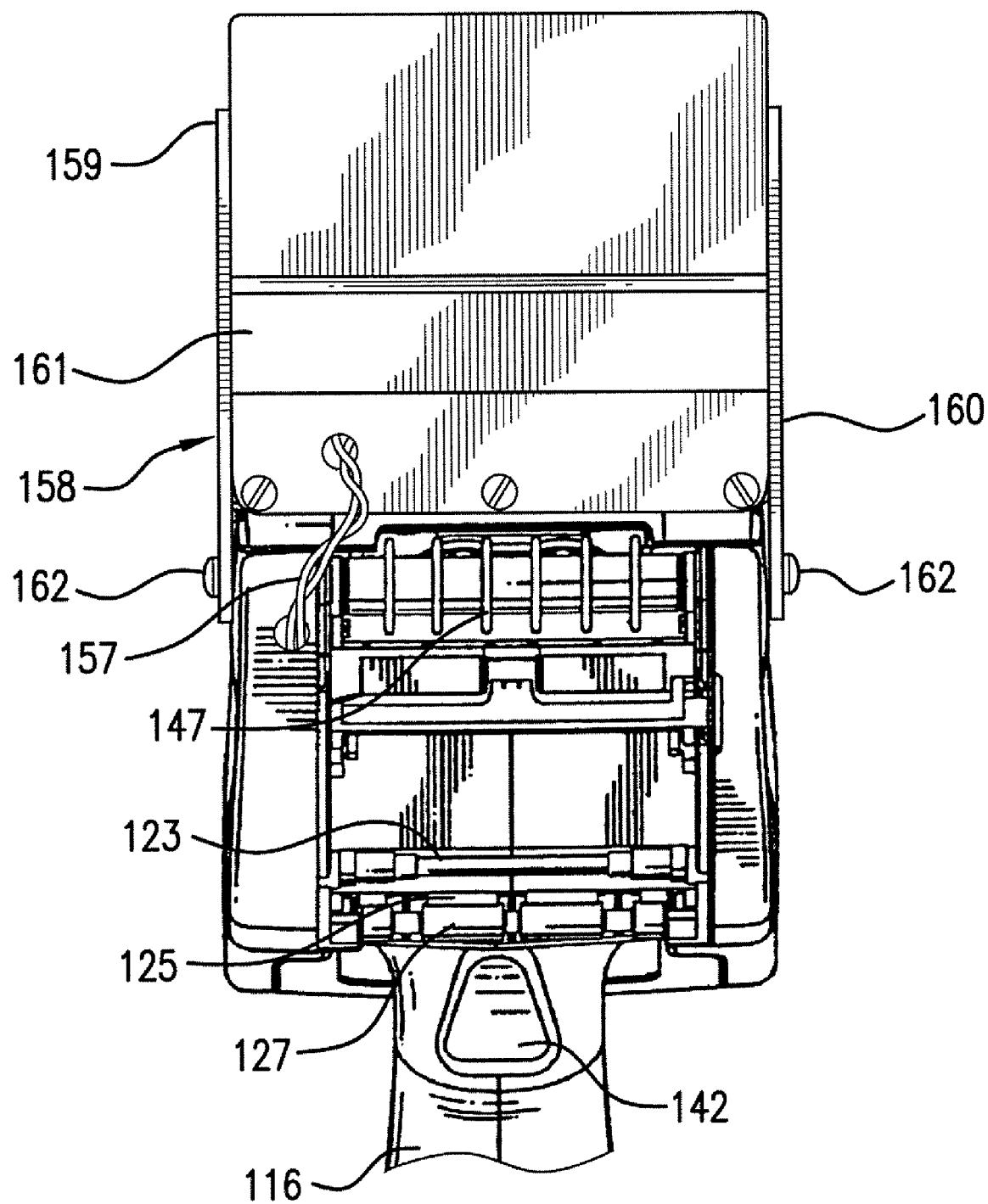
FIG. 6 is a front elevational view of the hand-held portable printer showing an antenna in a raised position to uncover the pathway for a carrier web of a label web in accordance with an aspect of the invention.

FIGS. 3 through 6 show antenna 115 which may be a loop antenna and the manner in which exterior antenna 115 is mounted to the exterior of the housing 112. The antenna 115 is electrically connected to the RFID reader/writer 136 by conductors 157. A mounting member generally indicated at 158 is shown to have a pair of arms 159 and 160 rigidly connected by a bar 161. The mounting member 158 is shown to be mounted for pivotal movement about screws 162 coaxial with the rotatably mounted applicator roll 147. The mounting member 158 is pivotable about the screws 162 and may be held in any selected position between a position against the lower front portion of the housing 116 or upward as shown in FIG. 6. The FIG. 6 position is particularly useful when threading the printer 110 because the pathway downwardly and partially around the roller 123 and to between the rolls 125 and 127 is accessible for threading. The mounting member 158 may be held suitably in any selected position between the limits stated above by any suitable means, such as a latch, a detent or by friction. For example, the screws 162 may be tightened to hold the antenna 115 in the selected position. As shown, the antenna 115 is screwed to the arms 159 and 160. As shown, the upper surface 163 of the antenna 115 is spaced below the applicator roll 147 sufficiently to provide space for the leading label L to exit the printer 110 and be applied by the applicator roll 147.

Figure 7:
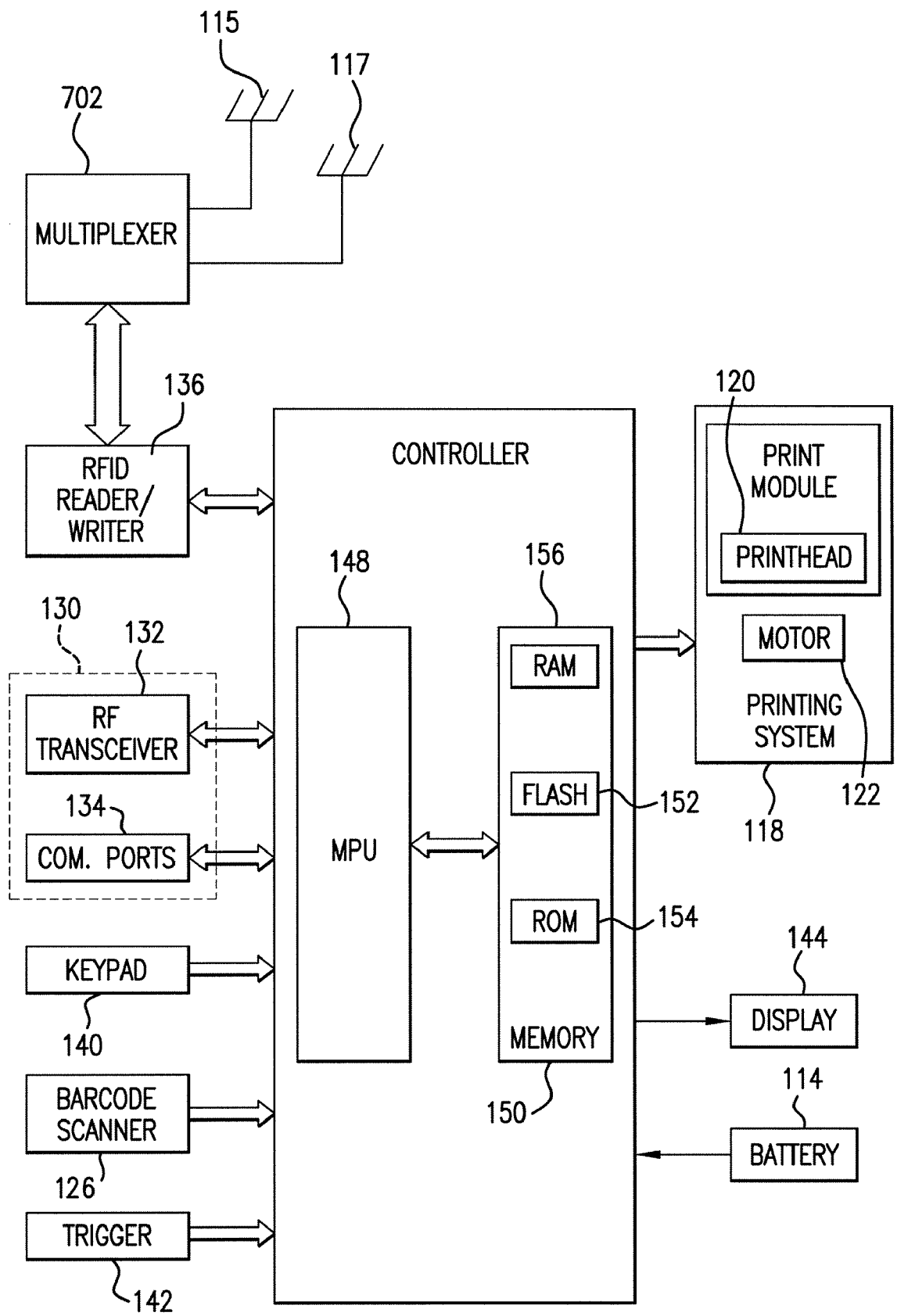
FIG. 7 is a block diagram of the printer also shown in FIGS. 3 through 6 in accordance with an aspect of the invention.

FIG. 7 illustrates a block diagram of the printer shown in FIGS. 3 through 6 in accordance with an aspect of the invention. FIG. 7 contains substantially the same components of FIG. 2 and those components have the same references characters increased by "100". FIG. 7, however, also illustrates both external antenna 115 and internal antenna 117 which are both electrically connected to RFID reader/writer 136. However, external antenna 115 and internal antenna 117 are preferably electromagnetically isolated from one another. A multiplexer 702 may receive signals from both external antenna 115 and internal antenna 117. Multiplexer 702 may switch which signal is provided to and/or received from RFID reader/writer 136.

Figure 8:
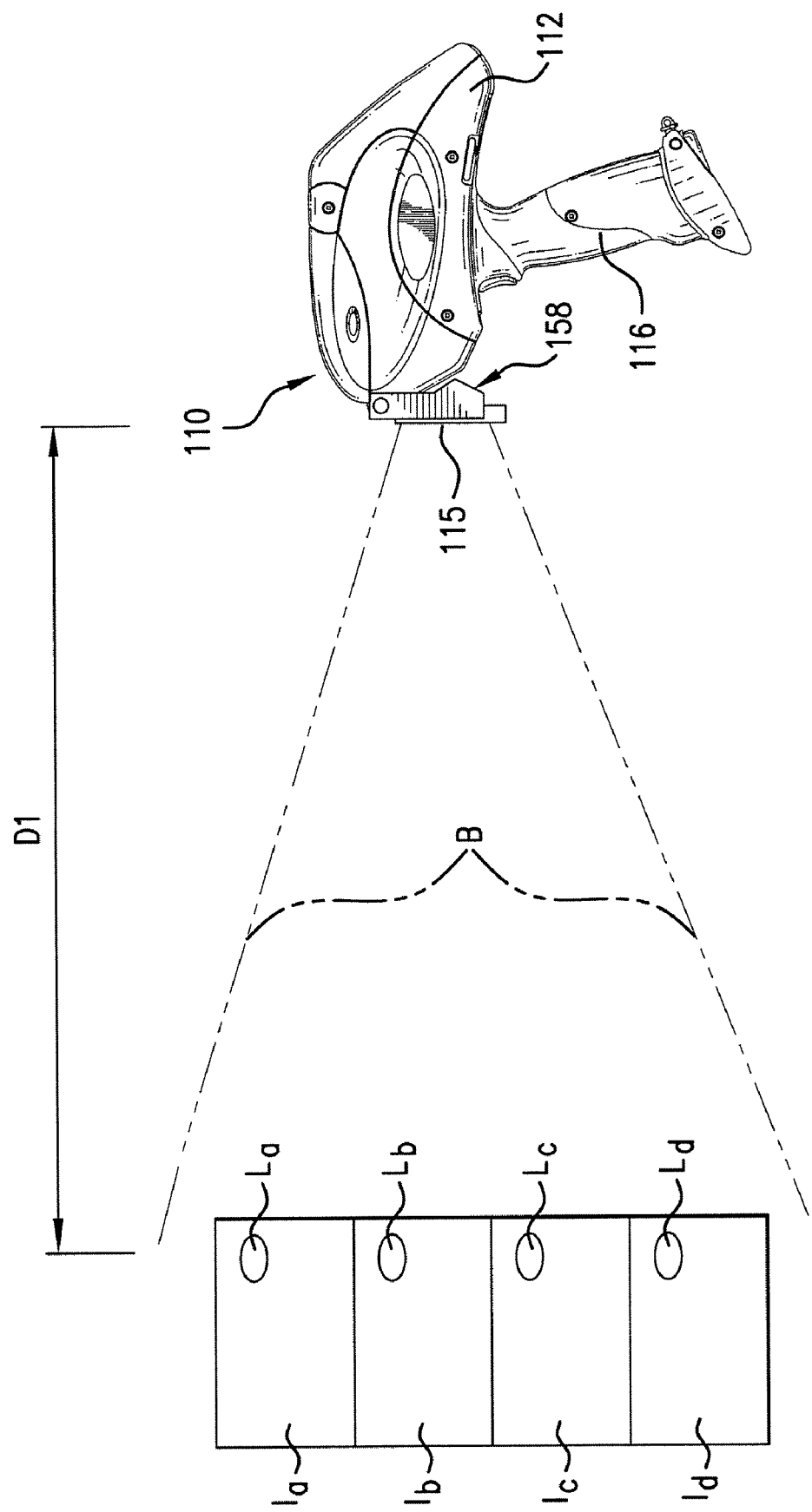
FIG. 8 is a diagrammatic view showing the printer of FIGS. 3 through 7 as reading and/or writing to a plurality of RFID chips in labels at a high energy level in accordance with an aspect of the invention.

FIG. 8 shows the printer 110 positioned to read or write to a plurality of RFID labels La through Ld at a time. In this mode, the RFID reader/writer 136 sends a high energy signal via the antenna 115 to the labels La through Ld. The labels La through Ld on items Ia through Id respectively are at a distance D1 from the antenna 115. The distance D1 is great enough to read all the intended RFID labels. The signal emitted by the antenna 115 is at a high energy level to read or write to all the RFID labels La through Ld.

Figure 9:
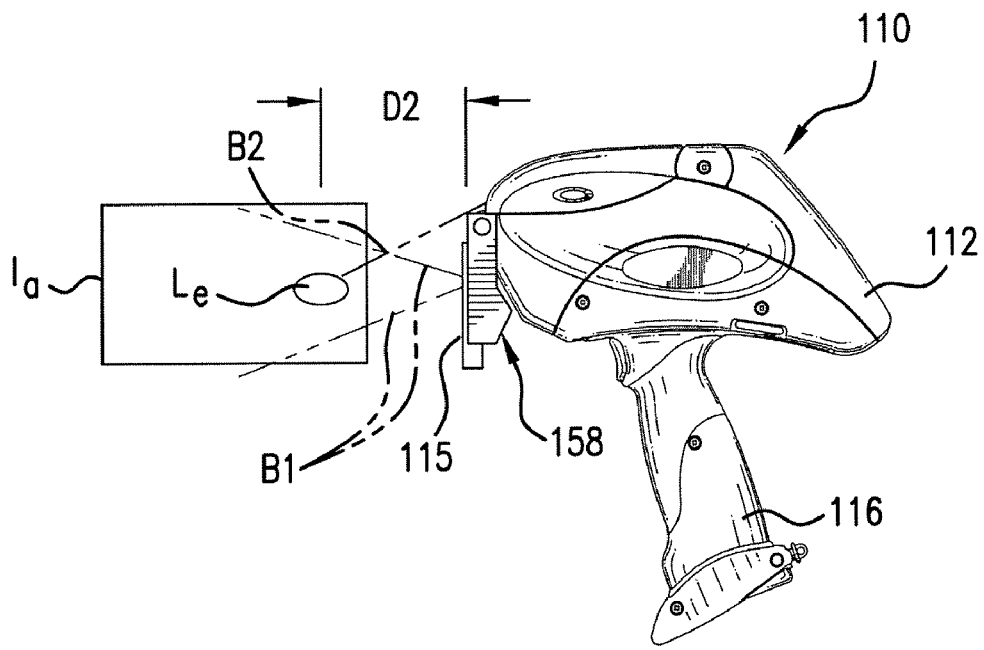
FIG. 9 is a diagrammatic view showing the printer of FIGS. 3 through 7 as reading and/or writing to a single RFID chip in a label at a low energy level in accordance with an aspect of the invention.

In FIG. 9, the RFID label Le is the only label containing an RFID chip that needs to be read so the RFID reader/writer 136 is placed in a mode so that the antenna emits a signal that is at a lower energy level than in the mode depicted in FIG. 8. The beam B1 from antenna 115 is directed to the RFID label Le. A pencil-like beam B2 may be emitted which may help the user aim the printer 110 at the RFID label Le. The inclination of the antenna 115 may be adjusted to aim the beams B1 and B2 in relation to the distances D1 or D2.

Figure 9A:
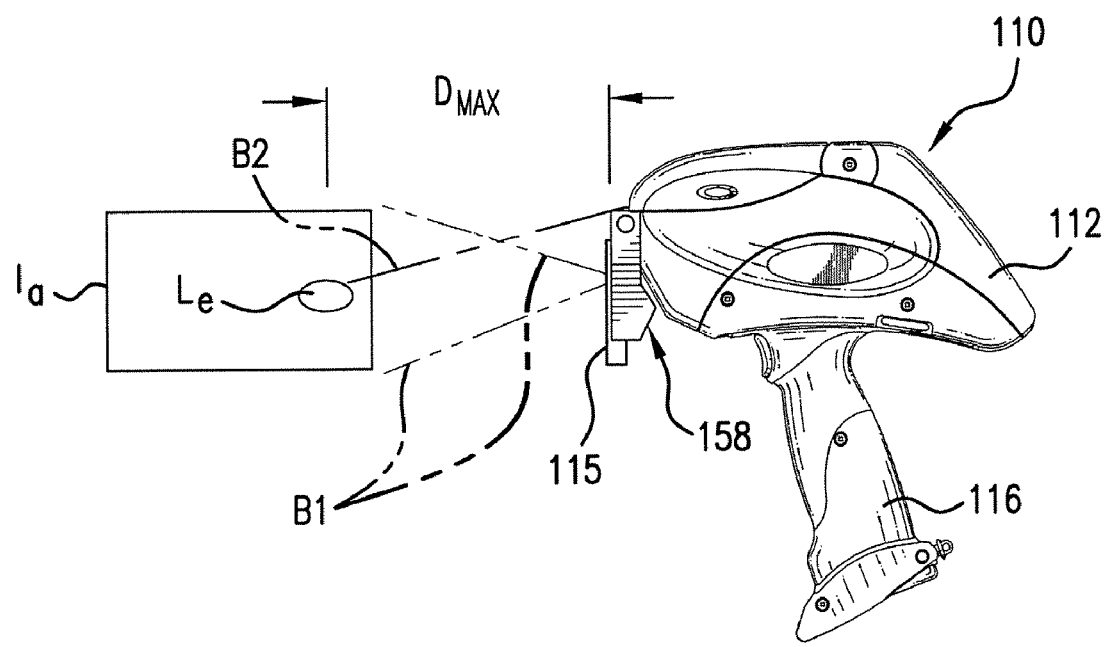
FIG. 9A is a diagrammatic view showing the printer of FIGS. 3 through 7 as reading and/or writing to a single RFID chip at a greater distance as that of FIG. 9A in accordance with an aspect of the invention.

FIG. 9A illustrates an aspect of the invention in which the RFID label Le is at a greater distance Dmax as compared to distance D2 of FIG. 9. RFID label Le is to be read by RFID reader/writer 136 which is placed in a mode so that the antenna emits a signal that is at a lower energy level than in the mode depicted in FIG. 8. The beam B1 from antenna 115 is directed to the RFID label Le. A pencil-like beam B2 may be emitted which may help the user aim the printer 110 at the RFID label Le. The inclination of the antenna 115 may be adjusted to aim the beams B1 and B2 in relation to the distances Dmax.

Figure 10:
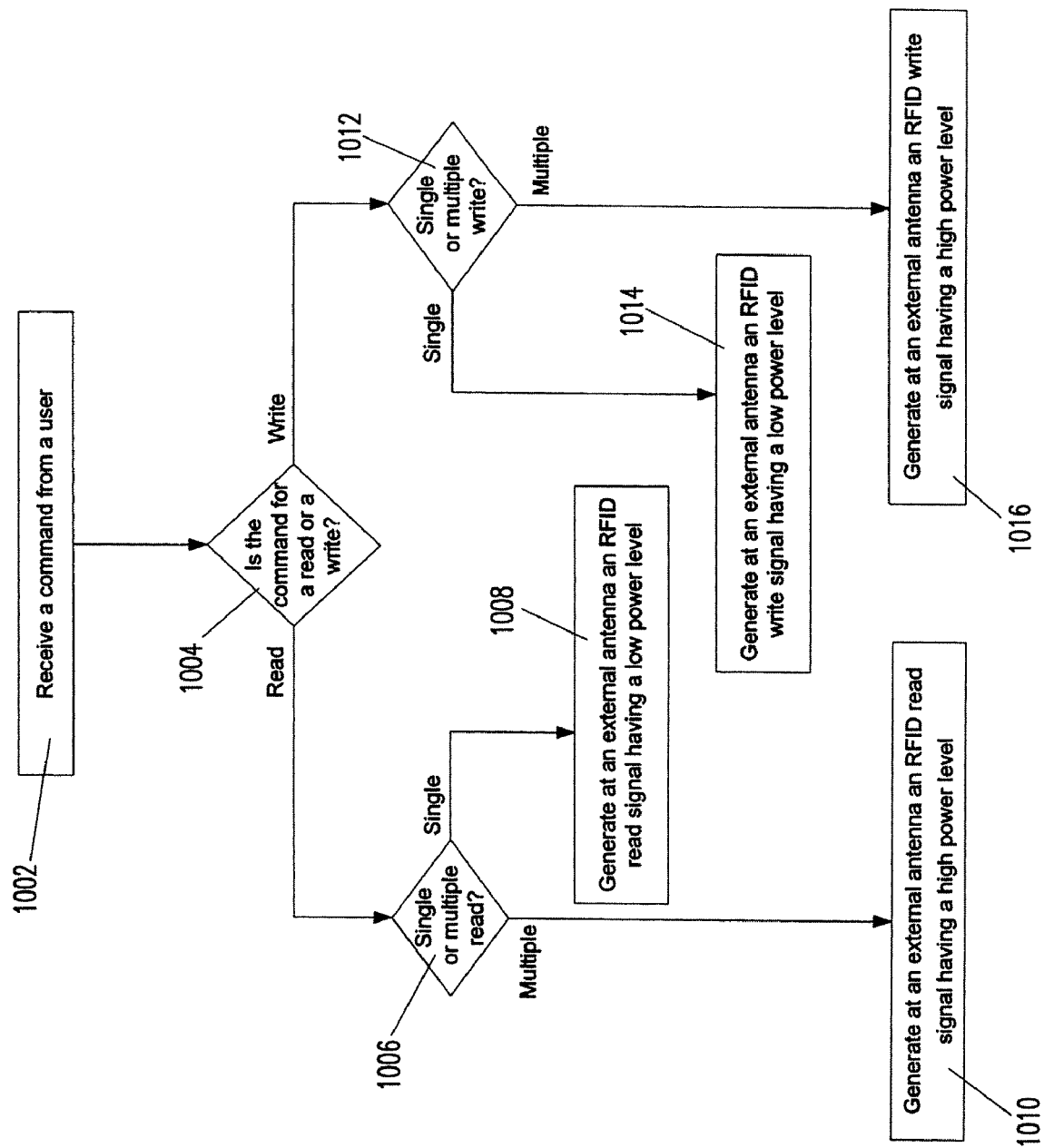
FIG. 10 is a flow chart relating to the method and apparatus for generating high and low energy levels in accordance with an aspect of the invention.

With reference to FIG. 10, a method that may be performed by a hand-held portable printer is illustrated when reading data from or writing data to external RFID labels, in accordance with an embodiment of the invention. First, in step 1002 a command is received from a user. The command may be provided via a trigger, keyboard, touch sensitive screen, voice activated module, or other input device. Next, it is determined whether the command is a read or a write command in step 1004. If the command is a read command, it is next determined whether the command is to read multiple RFID labels or a single RFID label in step 1006. In step 1008, a low energy level RFID read signal is generated at an external antenna when the read command is for a single RFID label. Such an antenna may be an antenna substantially similar to external antenna 115 (FIG. 4). In step 1010 a high energy level RFID read signal is generated at an external antenna, such as external antenna 115 (FIG. 4), when the read command is for multiple RFID labels.

If the command is a write command, it is next determined whether the command is to write to a plurality of RFID labels or a single RFID label in step 1012. In step 1014, a low energy level RFID write signal is generated at an external antenna 115 when the write command is for a single RFID label. In step 1016 a high energy level RFID write signal is generated at an external antenna 115 when the write command is for multiple RFID labels.

In another aspect of the invention, the hand-held portable printer may include a beeper or audio device. The hand-held portable printer set in a continuous read mode using the beeper or audio device may be used like a detection device or Geiger counter. A user utilizing the hand-held portable printer with this feature may not have to look at the display while trying to locate an item having an RFID tag as the device may audibly determine the location of RFID transponders. In an embodiment, a user may input an identification number of an item to be searched for using the hand-held portable device. Next, the RFID reader/writer may be enabled in a continuous read mode with an application continuously comparing RFID reads to the number/item being searched for within a search field.

As soon as the number/item is found in a general direction the antenna is facing then the beeper or audio device may emit a sound. As the hand-held portable printer gets closer to the item the continuous reads of the targeted item would fill a tag list, meaning the sound may eventually become a continuous tone.

FIGS. 11-15 illustrate user interactions with hand-held portable printer 110, labels and/or tags, and a PC/Host computer system 1111. FIGS. 11-15 will first be discussed to provide a detailed description of the process in accordance with various aspects of the invention. Following the detailed description of FIGS. 11-15, FIGS. 16-29 will be discussed which illustrate instructions in the form of computer-readable flow diagrams that may be implemented in various aspects of the invention by hand-held printer 110. The instructions in the form of flow diagrams may be program instructions comprising a single program or may be divided into various program modules. The program instructions may be compiled in to a processor-executable format and/or in a format such that the instructions can be interpreted by an interpreter. In addition, the program modules may be combined or distributed in various computing environments.

Figure 11:
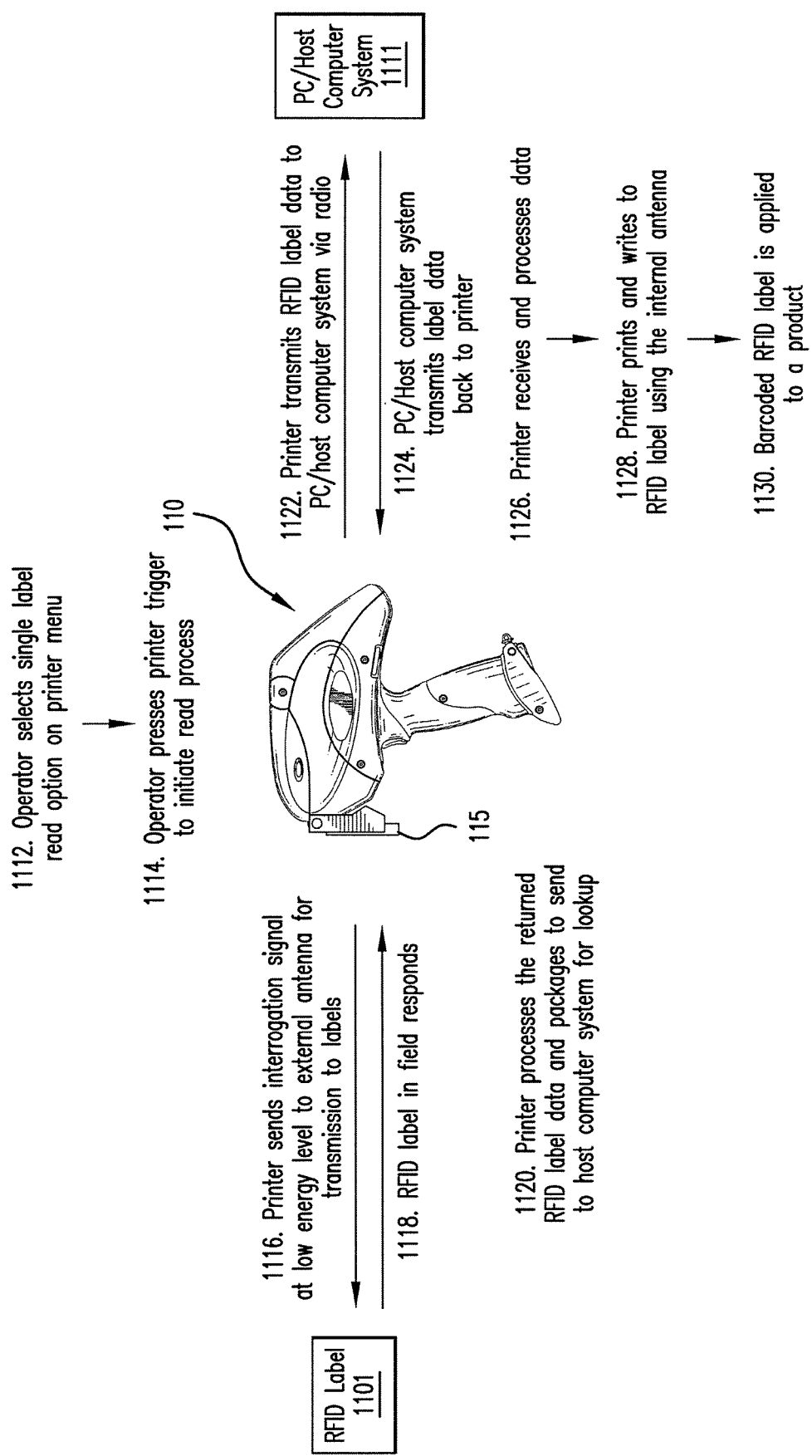
FIG. 11 is a flow chart showing RFID label reading and RFID label generation using a PC/host computer in accordance with an aspect of the invention.

FIG. 11 shows an example of using a hand-held portable printer and wireless interface to generate multiple barcode labels and/or RFID labels in accordance with an embodiment of the invention. The barcode labels and/or RFID labels may be applied to various items or to a shelf containing the items. In step 1112 an operator selects a single-label read option from a printer menu. In step 1114 the operator presses a trigger 142 on the hand-held portable printer in order to initiate a process for sending instructions to an RFID read/write module within hand-held portable printer 110. The process may also by initiated by operating a key on the keypad 140. Next, hand-held portable printer 110 sends an interrogation signal at a low energy level to external antenna 115 for transmission to RFID labels 1101 in step 1116. The interrogation signal may be a conventional RFID interrogation signal. In response to the interrogation signal, in step 1118 RFID label 1101 responds to hand-held portable printer 110 with RFID label data. The RFID label data may include data identifying products, packages, vendors, quantities, expiration dates or any other attributes of the items to which the RFID labels are affixed.

In step 1120 hand-held portable printer 110 processes the returned RFID label data and packages the data to send to host computer system 1111 or a remote location for lookup. Packaging may include formatting the data into a protocol that is used for communication between printer 110 and host computer system 1111. For example, packaging may include formatting a bit stream in accordance with a wireless communication protocol, such as IEEE 801.11B, IEEE 801.11G, Bluetooth, etc. Hand-held portable printer 110 then transmits RFID label data to host computer system 1111 via a radio or other wireless mechanism in step 1122. Host computer system 1111 then associates the RFID label data to other data such as price information or any other data that may be printed on a label or used to create a barcode. In step 1124, host computer system 1111 transmits barcode label information back to printer 110. Hand-held portable printer 110 then receives and processes data in step 1126. Processing may include creating a barcode pattern or other image to print on a label. In step 1128 printer 110 prints an RFID label for each label that responded in step 1118. Finally, in step 1130 barcoded RFID labels may be applied to each product or other item.

Figure 12:
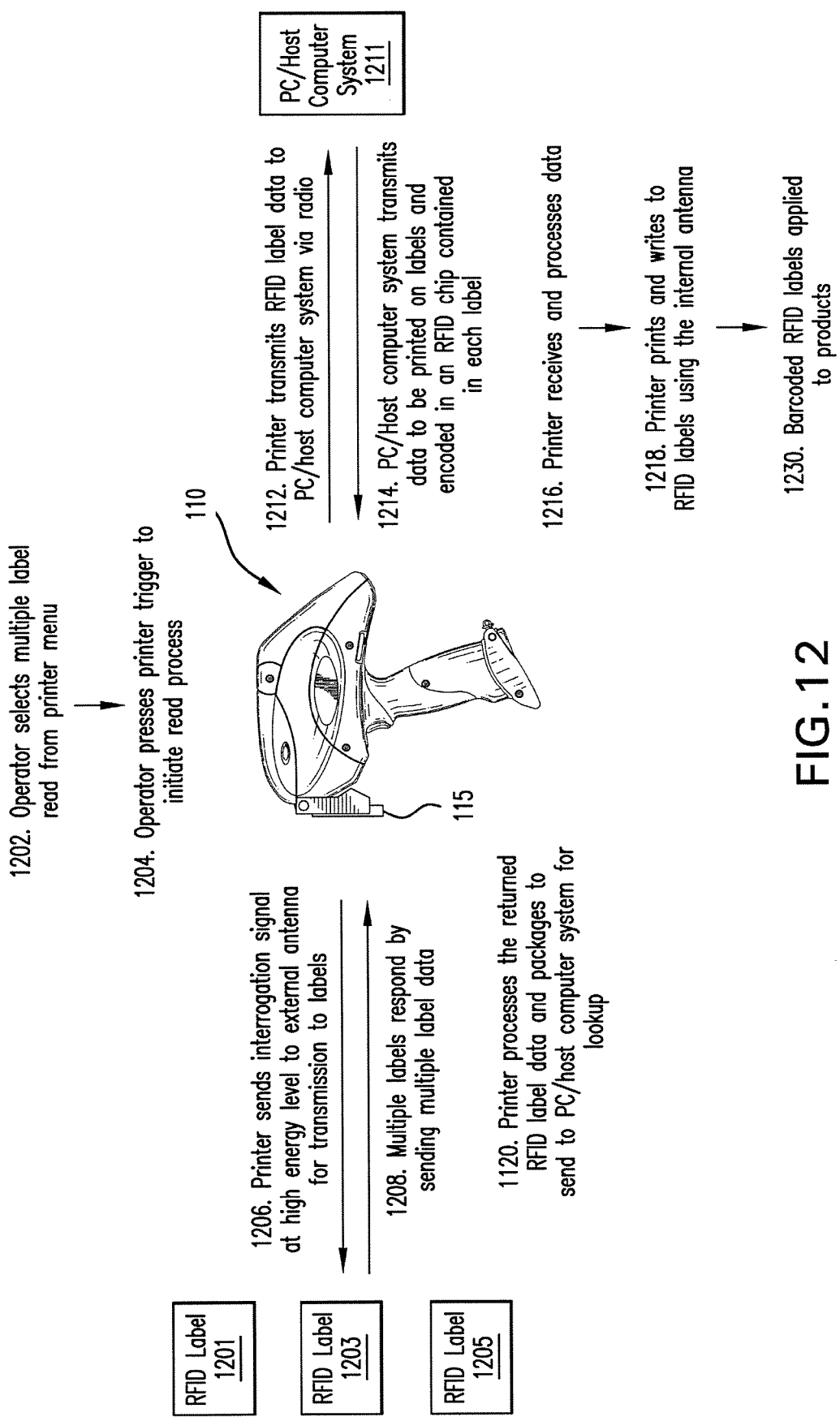
FIG. 12 is a flow chart showing multiple RFID labels reading and multiple RFID label generator using a PC/host computer in accordance with an aspect of the invention.

FIG. 12 shows an example of using a hand-held portable printer 110 and wireless interface to generate RFID labels in accordance with an embodiment of the invention. First, in step 1202 an operator selects a multiple label read option from a hand-held portable printer menu. The operator may press a hand-held portable printer trigger to initiate a process for sending instructions to an RFID module 136 on hand-held portable printer 110 in step 1204. In step 1206 hand-held portable printer 110 sends an interrogation signal at a high energy level to an external antenna 115 for transmission to labels 1201, 1203 and 1205. In step 1208 multiple labels respond by sending label data back to hand-held portable printer 110.

In step 1210 hand-held portable printer 110 processes the return RFID label data and packages the data to send to host computer system 1211 for lookup. In step 1212 hand-held portable printer 110 transmits RFID label data to host computer system 1211 via a radio or other wireless mechanism. Of course, hand-held portable printer 110 may alternatively be connected to host computer system 1211 via a wired connection and use a conventional protocol, such as Ethernet, to communicate with host computer system 1211. In step 1214, host computer system 1211 transmits data to be thermally printed on a label inside the printer and encoded in a RFID transponder contained within the label. Next, in step 1216 hand-held portable printer 110 receives and processes data received back from host computer system 1211. Step 1216 may include changing the format of received digital data, creating an image or any other processing steps that are required for subsequent printing and writing. Hand-held portable printer 110 sends a write command to a RFID reader-writer 136 and encodes the transponder contained in a label using the internal antenna 117 in step 1218. Finally, the hand-held portable printer 110 applies the barcoded RFID label to the product in step 1230.

Figure 13:
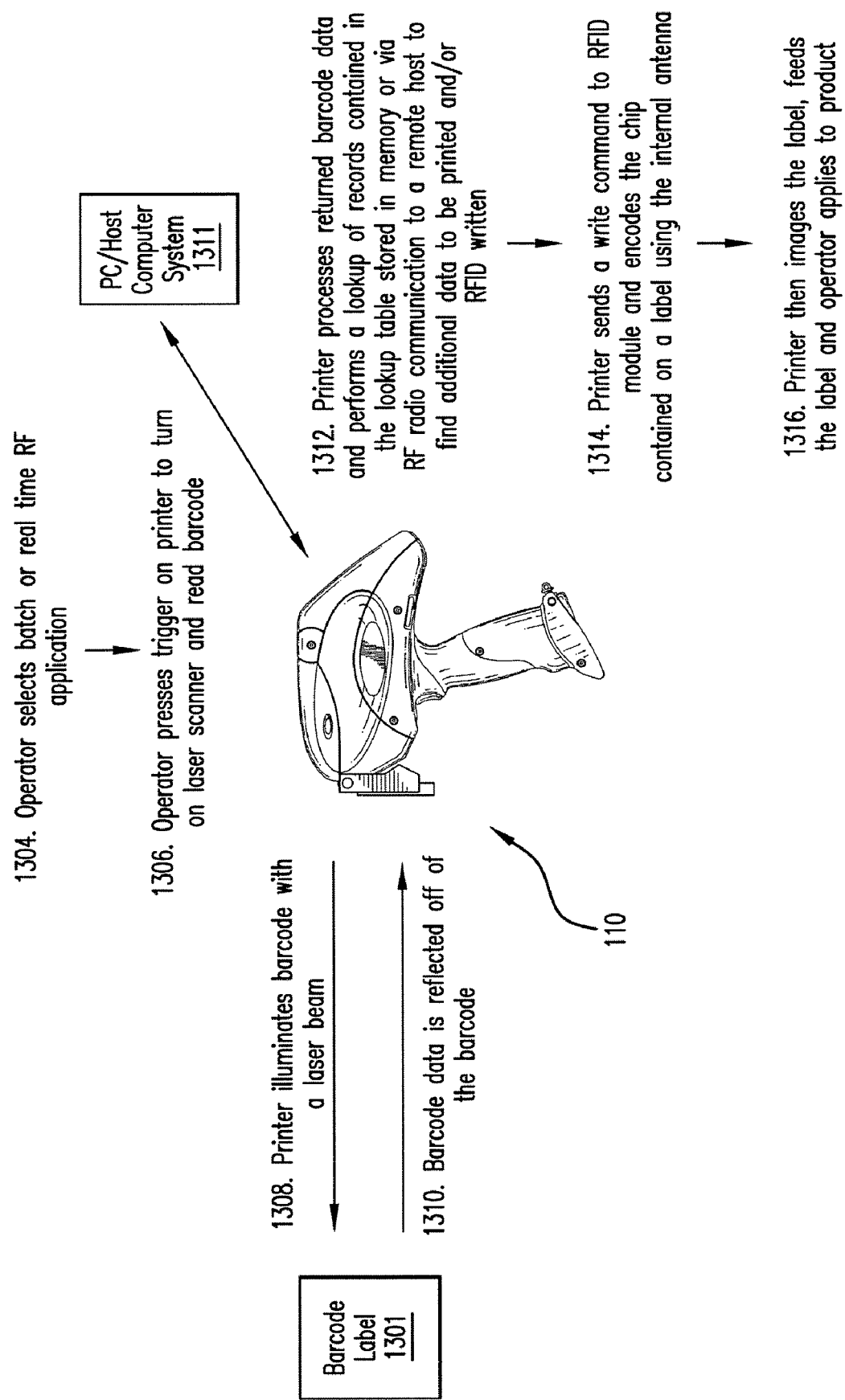
FIG. 13 is a flow chart showing RFID labels generated in reference to reading a barcode using the hand-held portable printer in accordance with an aspect of the invention.

FIG. 13 shows an example of using a hand-held portable printer 110 and local lookup table or batch application to generate RFID labels in accordance with an embodiment of the invention. First, in step 1304 an operator selects a batch or real-time RF application. The batch option utilizes data stored locally within printer 110 and the real time option utilizes data stored at remote host computer system 1311. In step 1306, an operator presses a trigger on hand-held portable printer 110 to turn on the laser scanner and read a barcode label 1301. Next, in step 1308 hand-held portable printer 110 illuminates barcode label 1301 with a laser beam or other visual identifier. Barcode data is reflected off of barcode label 1301 in step 1310.

Hand-held portable printer 110 processes returned barcode data and performs a lookup of records contained in the lookup table stored in local memory or via RF radio communication to remote host computer system 1311 to find additional information to be printed on RFID label in step 1312. In step 1314, printer 110 sends a write command to an RFID reader/writer and encodes the chip contained on a label in the printer using the internal antenna 117. In addition, verification that the chip has been properly encoded may be preformed. Finally, in step 1316 hand-held portable printer 110 images a label, feeds the label, and applies the label to a product.

Figure 14:
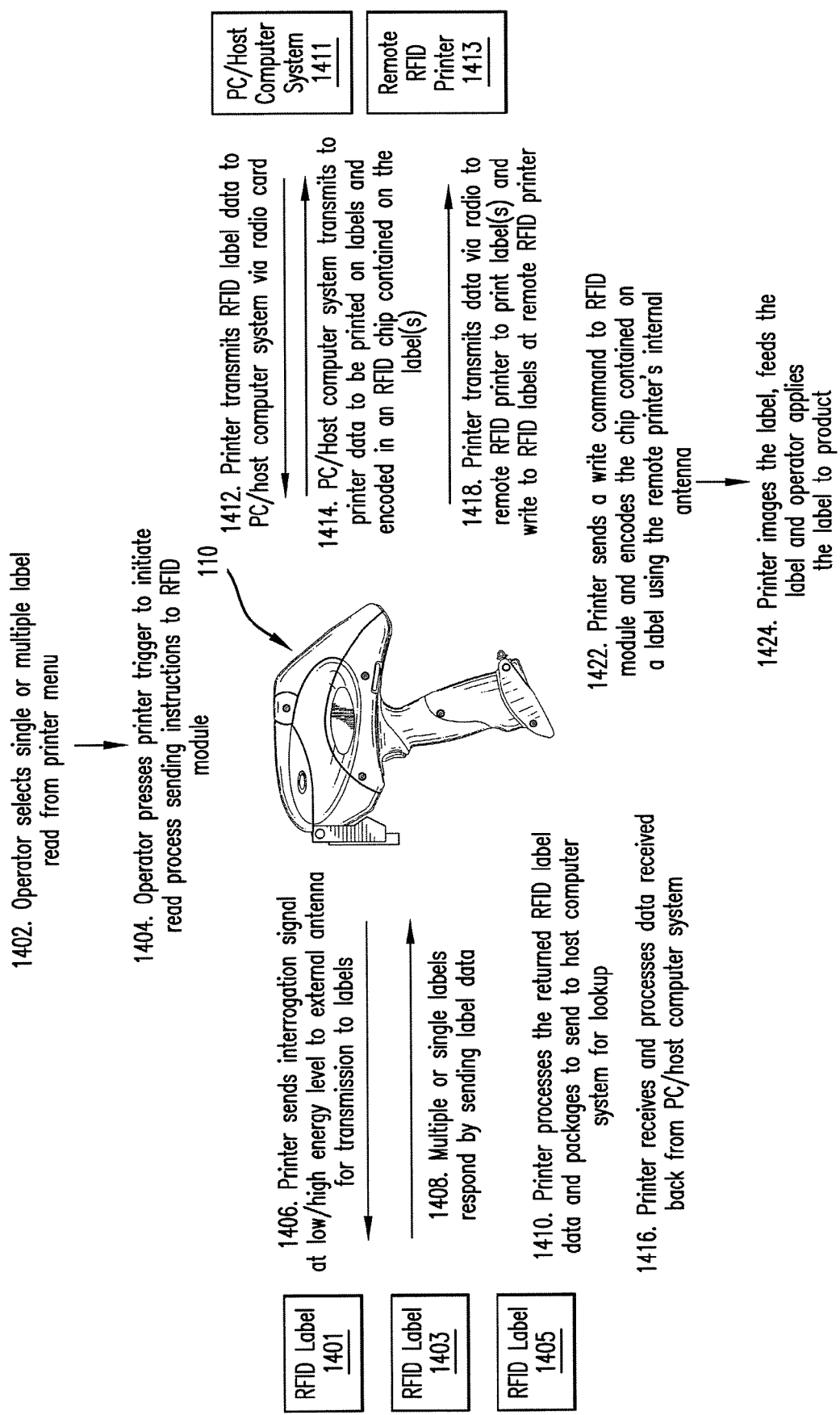
FIG. 14 is a flow chart showing RFID record members generated in one or both of a hand-held printer and a remote printer in accordance with an aspect of the invention.

FIG. 14 shows an example of using a hand-held portable printer 110 and a remote printing device to generate RFID labels in accordance with an embodiment of the invention.

First, in step 1402 an operator selects a single or multiple label read option from a hand-held portable printer menu. The operator may press a hand-held portable printer trigger to initiate a process for sending instructions to an RFID reader/writer 136 within printer 1001 in step 1404. Based on the selection made in step 1402, in step 1406 hand-held portable printer 110 sends an interrogation signal at a low or high energy level to an external antenna 115 for transmission to labels 1401, 1403 and 1405. If a single label read option has been selected, a low-energy signal will be transmitted and if a multiple label read option has been selected, a high-energy signal will be transmitted. In step 1408, multiple or single labels respond by sending label data back to hand-held portable printer 110.

In step 1410, hand-held portable printer 110 processes the returned RFID label data and packages the data to send to host computer system 1411 for lookup. In step 1412, hand-held portable printer 110 transmits RFID label data to host computer system 1411 via a radio or other wireless mechanism. In step 1414 host computer system 1411 transmits data to be printed on labels and encodes the data in a RFID chip contained on the labels.

Next, in step 1416 hand-held portable printer 110 receives and processes data received back from host computer system 1411. Hand-held portable printer 110 transmits data via the radio or other wireless mechanism to a remote RFID printer 1413 to print labels, such as pallet labels, and write to RFID labels in the printer in step 1418. In an alternative embodiment, host computer system 1411 is connected to and sends data to remote RFID printer 1413.

In step 1422, hand-held portable printer 110 sends a write command to a RFID module 136 and encodes the chip contained on a label using the remote printer's internal antenna. Finally, the printer images the label, feeds the label, and applies the label to the product in step 1424.

Figure 15:
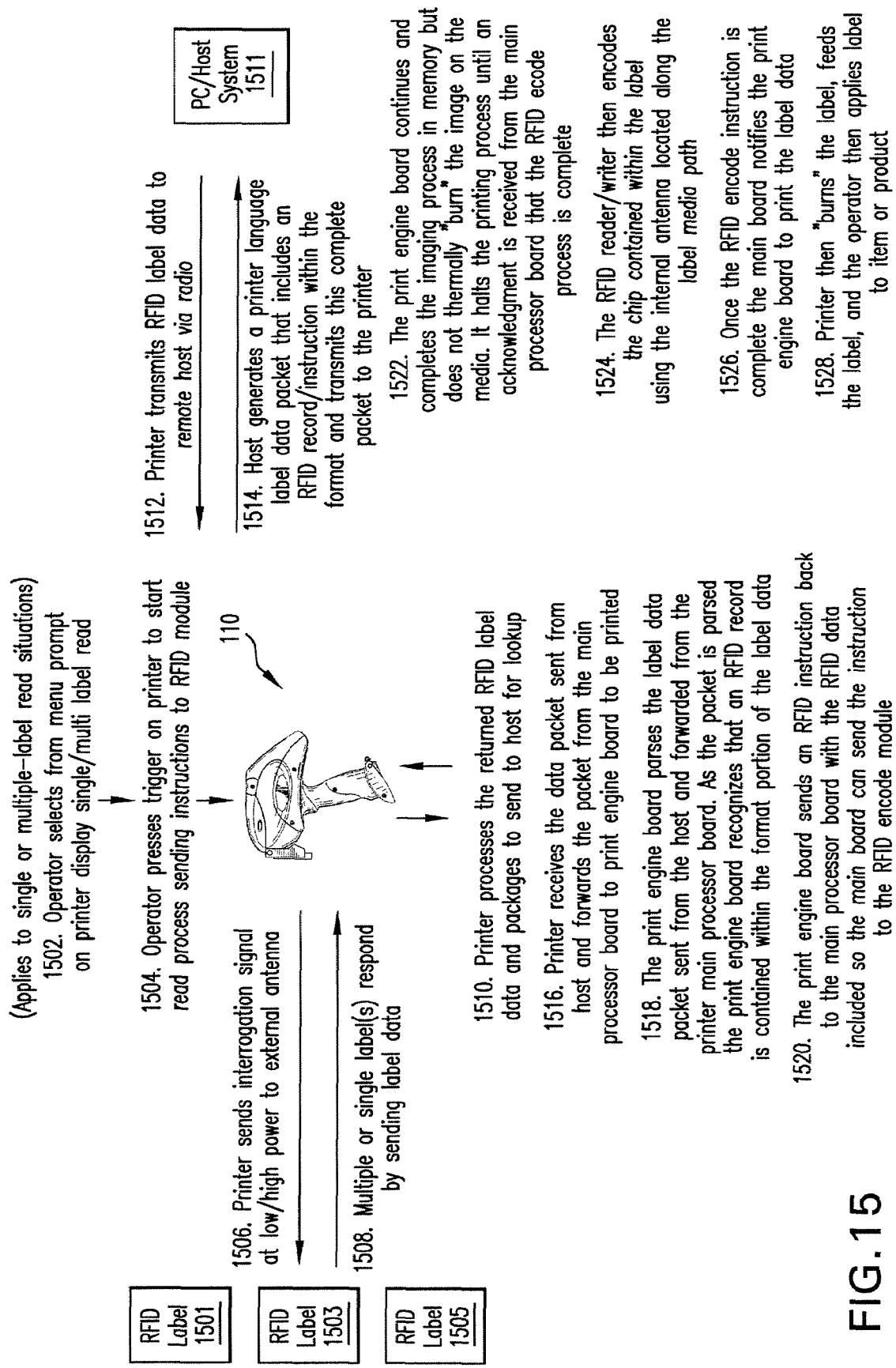
FIG. 15 is a flow chart showing RFID record members generated in one or both of a hand-held printer and a remote printer in accordance with an aspect of the invention.

FIG. 15 shows an example of using a hand-held portable printer 110 and a remote printing device to generate RFID labels in accordance with an embodiment of the invention. First, in step 1502 an operator selects a single or multiple label read option from a hand-held portable printer menu. The operator may press a hand-held portable printer trigger to initiate a process for sending instructions to an RFID reader/writer 136 within printer 110 in step 1504. Based on the selection made in step 1502, in step 1506 hand-held portable printer 110 sends an interrogation signal at a low or high energy level to an external antenna 115 for transmission to labels 1501, 1503 and 1505. If a single label read option has been selected, a low-energy signal will be transmitted and if a multiple label read option has been selected, a high-energy signal will be transmitted. In step 1508, multiple or single labels respond by sending label data back to hand-held portable printer 110.

In step 1510, hand-held portable printer 110 processes the returned RFID label data and packages the data to send to host computer system 1511 for lookup. In step 1512, hand-held portable printer 110 transmits RFID label data to host computer system 1511 via a radio or other wireless mechanism. In step 1514 host computer system 1511 generates a printer language label data packet that includes a RFID record/instruction within the format and transmits the data to handheld portable printer 110. The printer language may include a Monarch Printer Control Language (MPCL™) packet or other suitable language which contains an RFID record.

Next, in step 1516 hand-held portable printer 110 receives and processes the data packet from host computer system 1511. The hand-held printer 110 may internally forward the data packet from a main processor board to a print engine board to be printed. In step 1518, the print engine board may parse the label data packet sent from the host computer system 1511. As the packet is parsed, the print engine may recognize that the RFID record is contained within the format portion of the label data.

In step 1520, the print engine board may send a RFID instruction back to the main processor board with the RFID data included so that the main board may send the instruction to the RFID encode module.

Next, in step 1522 the print engine board continues and completes the imaging process in memory but does not burn the image. The printing process may be halted until an acknowledgement is received from the main processor board that the RFID encode process is completed. Once the RFID encode process is completed, the RFID encode module may encode the chip contained on the label using internal antenna 117 located along the media path in step 1524.

In step 1526, the main board may notify the print engine board that the label data may be printed upon completion of the RFID encoding. Finally, in step 1528 the hand-held portable printer 110 may image the label, feed the label, and an operator applies the label to the product.

FIGS. 16-29 illustrate instructions in the form of flow diagrams that may be implemented in various aspects of the invention by hand-held portable printer 110. As discussed above, FIGS. 16-29 may comprise a single program stored in memory 150 or may be separated into various modules for execution by microprocessor 148. Those skilled in the art will realize that multiple processors may also be utilized. In addition, the instructions may be compiled or interpreted.

Figure 16:
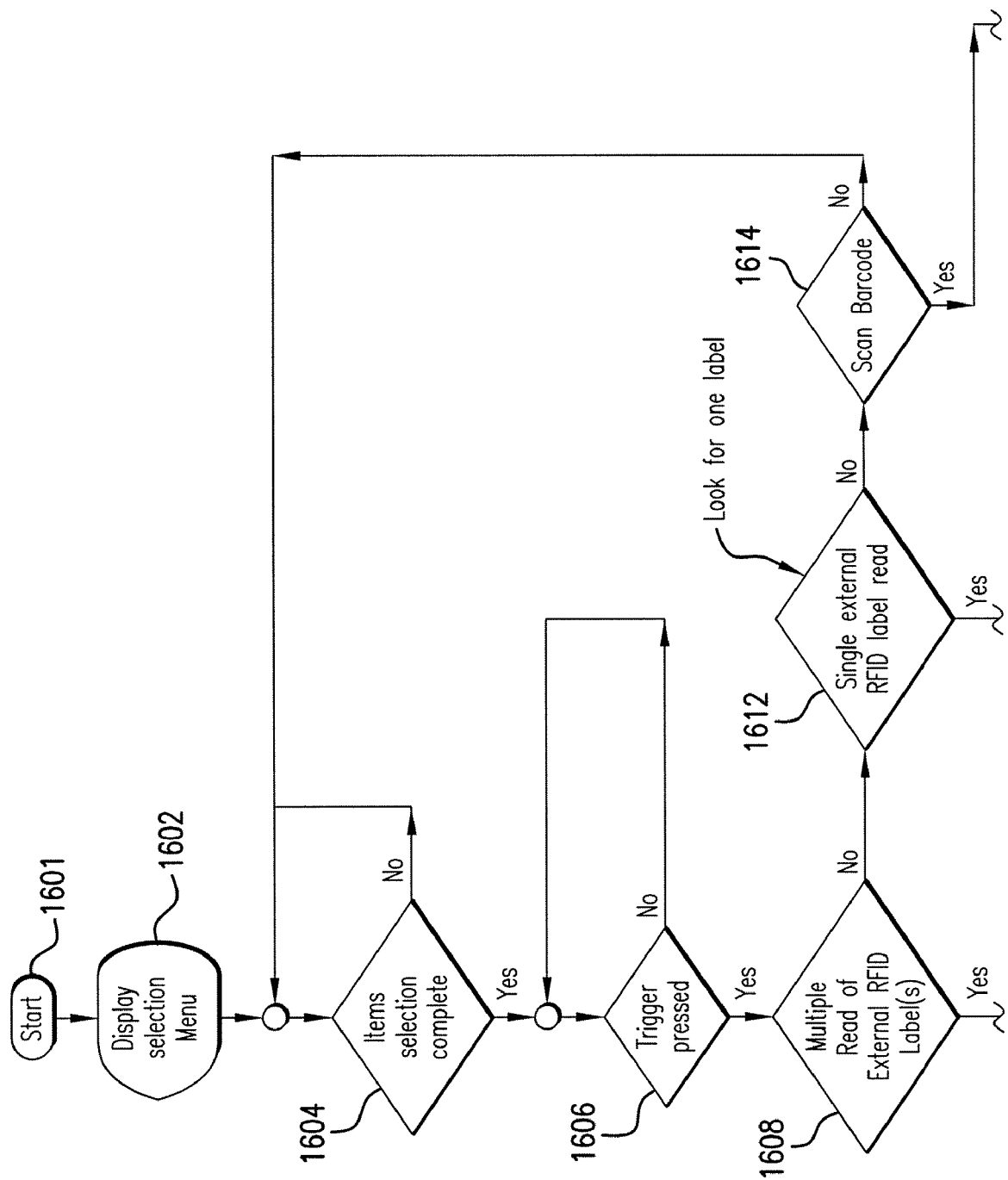
FIG. 16 is a flow chart showing RFID record members generated in one or both of a hand-held printer and a remote printer in accordance with an aspect of the invention.
Figures 1, 16:
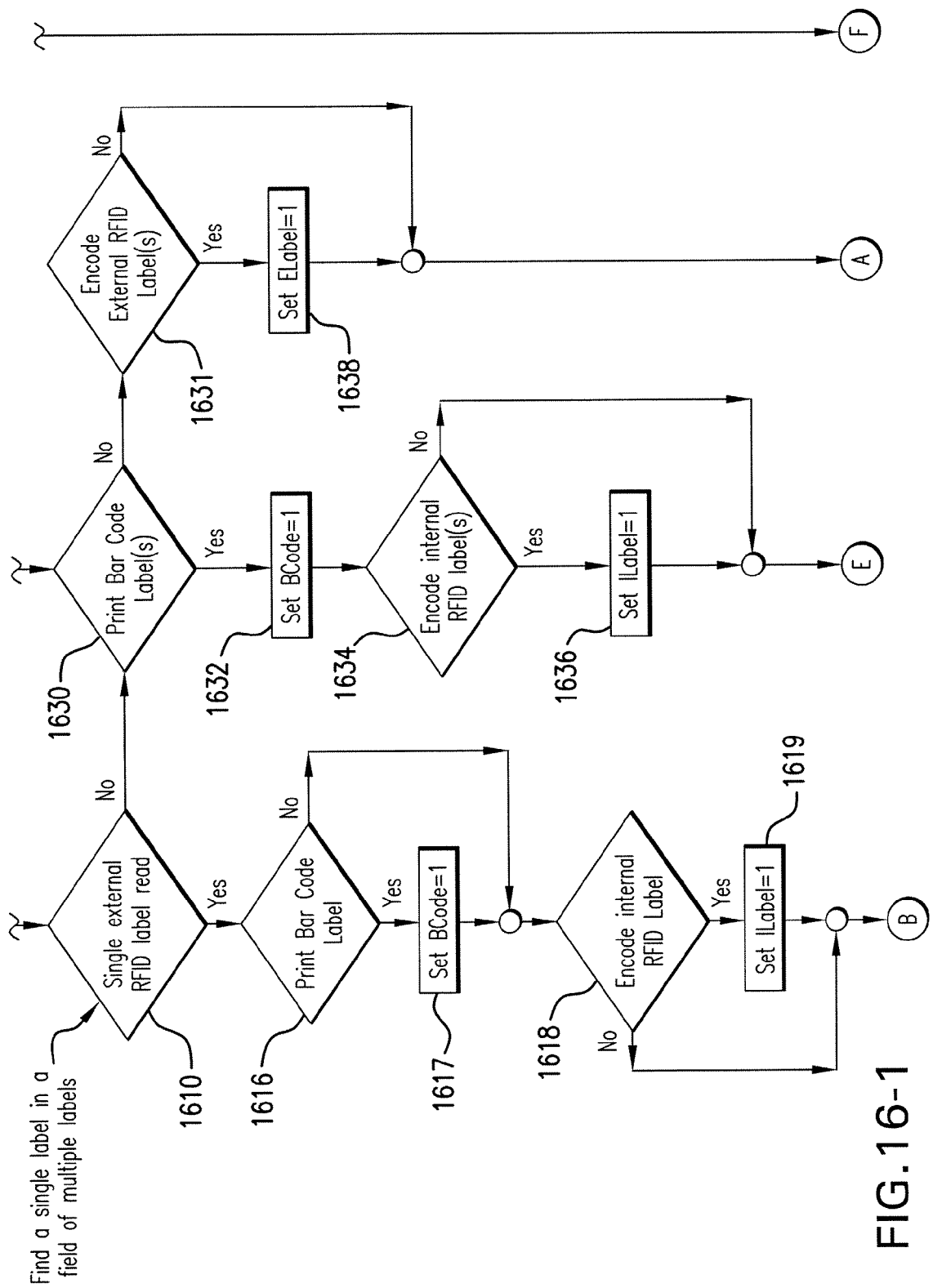

In FIG. 16, the process begins at step 1601 and advances to step 1602 in which a display selection menu may be displayed to a user. The display selection menu may enable users to directly select the function to be performed by the hand-held portable printer 110. In step 1604, a determination is made as to whether the user has completed selection of the items displayed in the displayed selection menu. If the selection has been completed, then in step 1606 the user may activate the trigger on the hand-held portable printer 110. The hand-held portable printer 110 may wait until the user activates the trigger to proceed to step 1608.

When the user presses the trigger, a number of determinations are made based on criteria that were previously selected by the user. For example, in step 1608 it may be determined if multiple reads of external RFID labels are to be performed. If multiple reads of external RFID labels are to be performed then in step 1610 a determination is made whether the hand-held portable printer 110 is looking for a single label within a field of multiple labels. However, if multiple reads of external RFID labels are not to be determined then in step 1612 a determination is made if a single external label is to be read. If a single external RFID label is not to be read, then in step 1614 it is determined if a hand-held portable printer 110 is to provide bar code scanning functionality. Depending on the items selected by the user one of the paths shown in the flow diagram of FIG. 16 will be followed. We discuss each path in turn in the below description.

Figure 17:
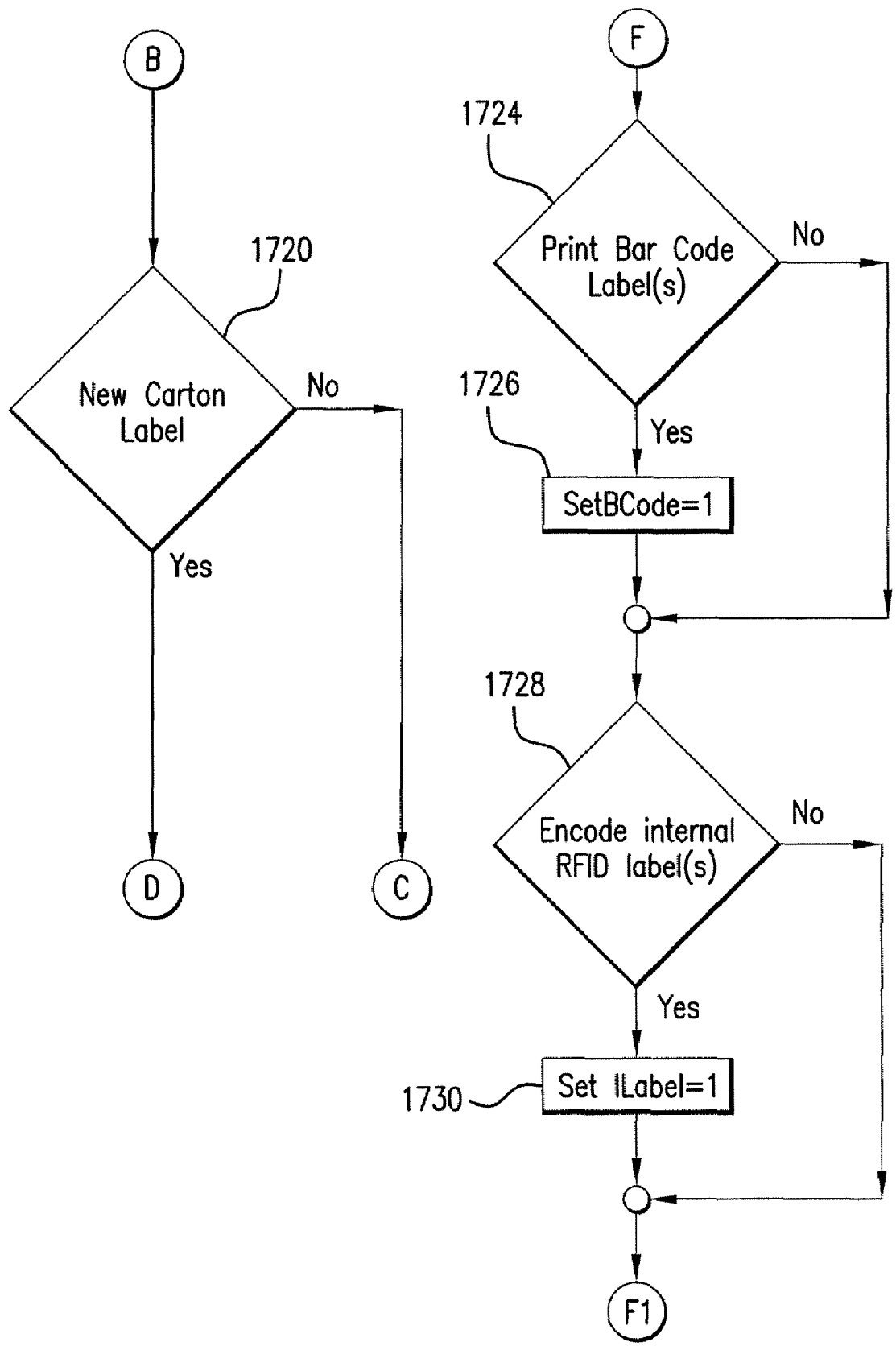
FIG. 17 is a continued flow diagram of FIG. 16-1 showing RFID record members generated in one or both of a hand-held printer and a remote printer in accordance with an aspect of the invention.

Returning to step 1610, a determination is made whether the hand-held portable printer 110 is looking for a single label within a field of multiple labels. If the hand-held portable printer 110 is looking for a single label within a field of multiple labels, then a series of determinations are made in steps 1616, 1618, and 1720 (FIG. 17). In particular in step 1616, a determination may be made if a bar code label should be printed. If a bar code label is to be printed, a bar code flag such as BCode is set as shown in step 1617. Next, in step 1618 a determination is made regarding encoding of an internal RFID label. If an internal RFID label is to be encoded, then in step 1619 a flag such as the ILabel flag is set indicating that an internal RFID label is to be encoded.

Figure 18:
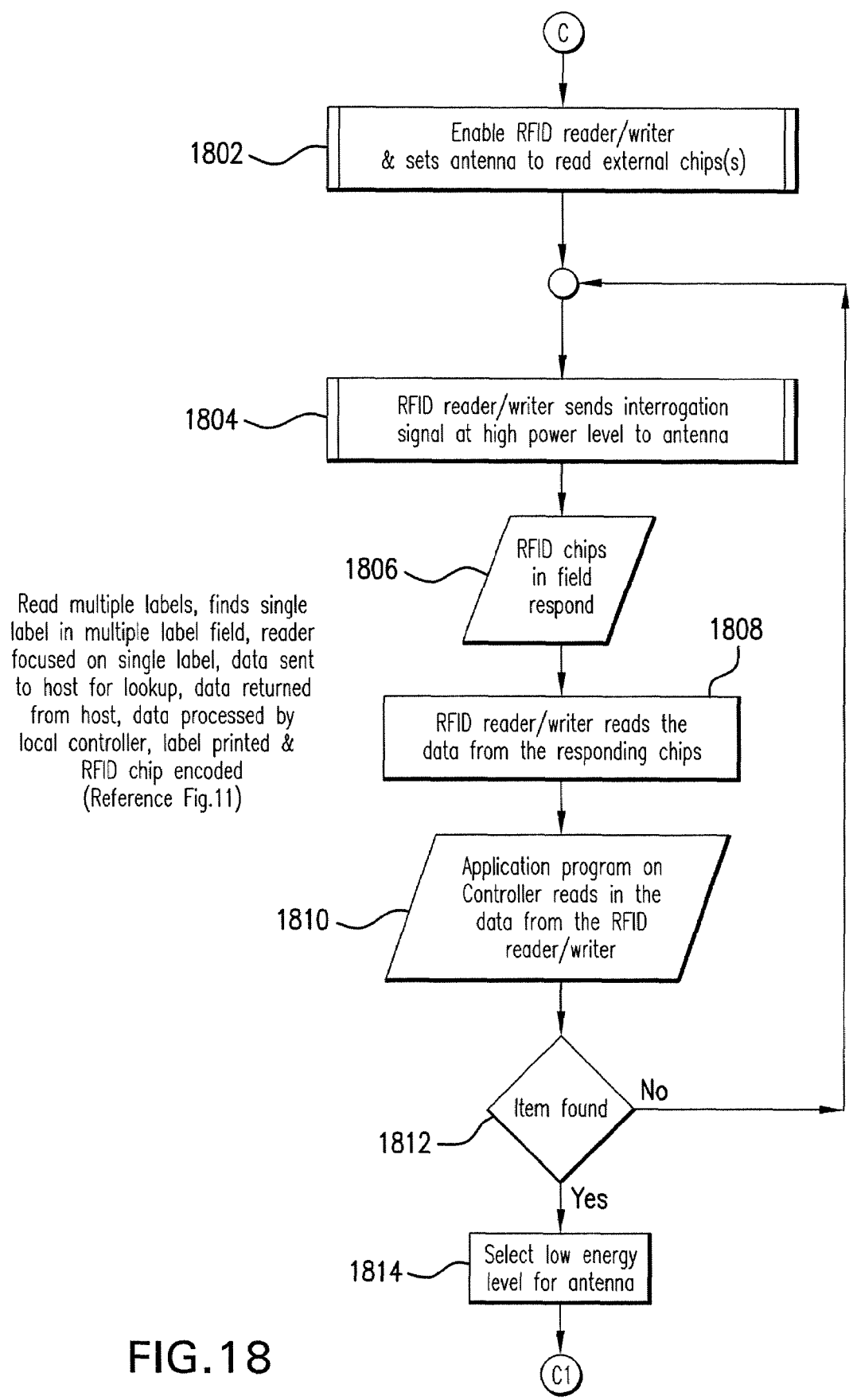
FIG. 18 is a continued flow diagram of FIG. 16-1 showing RFID label reading and RFID label generation using a PC/host computer in accordance with an aspect of the invention.
Figure 19:
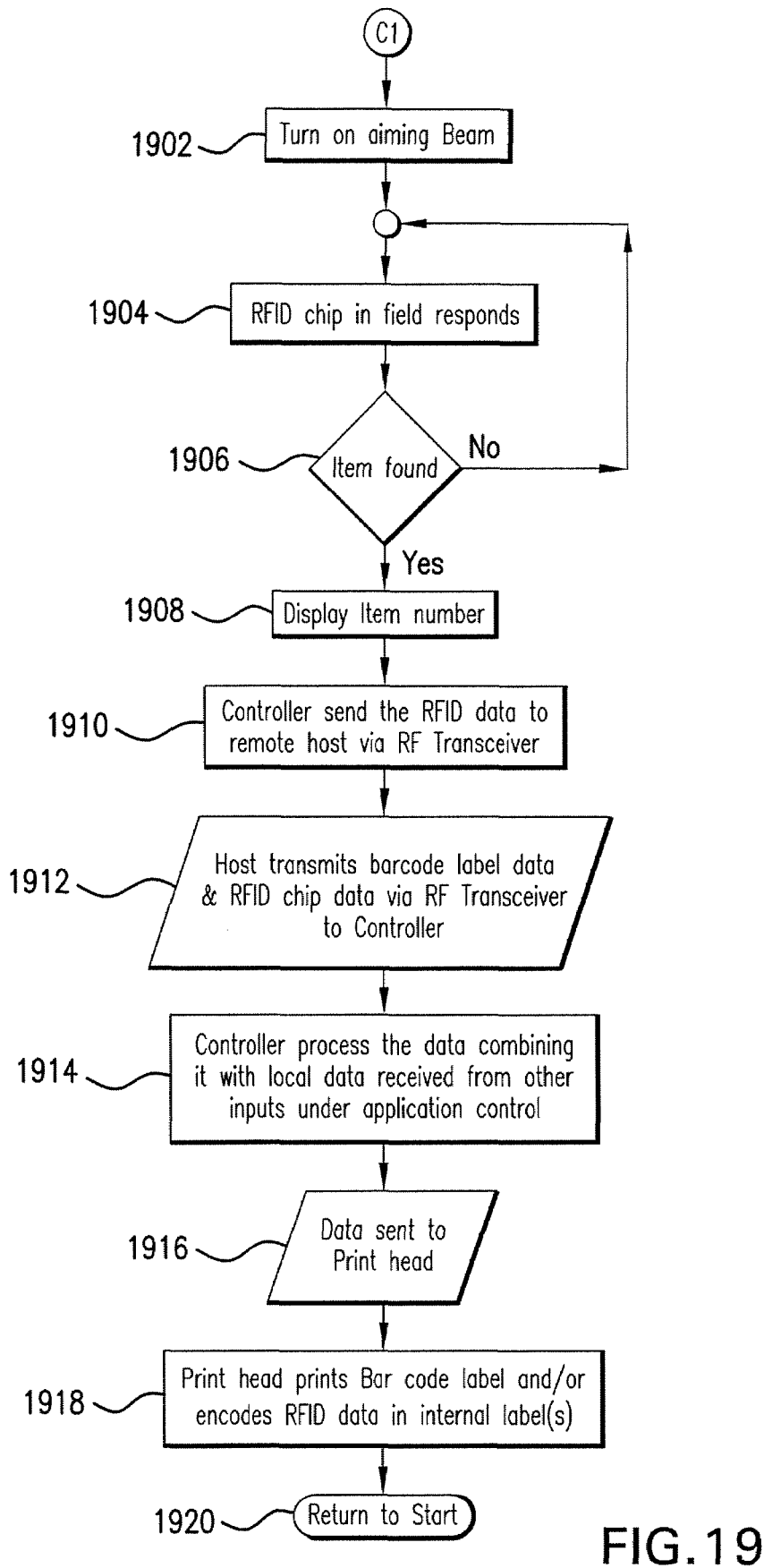
FIG. 19 is continued flow diagram of FIG. 18 showing RFID label reading and RFID label generation using a PC/host computer in accordance with an aspect of the invention.
Figure 20:
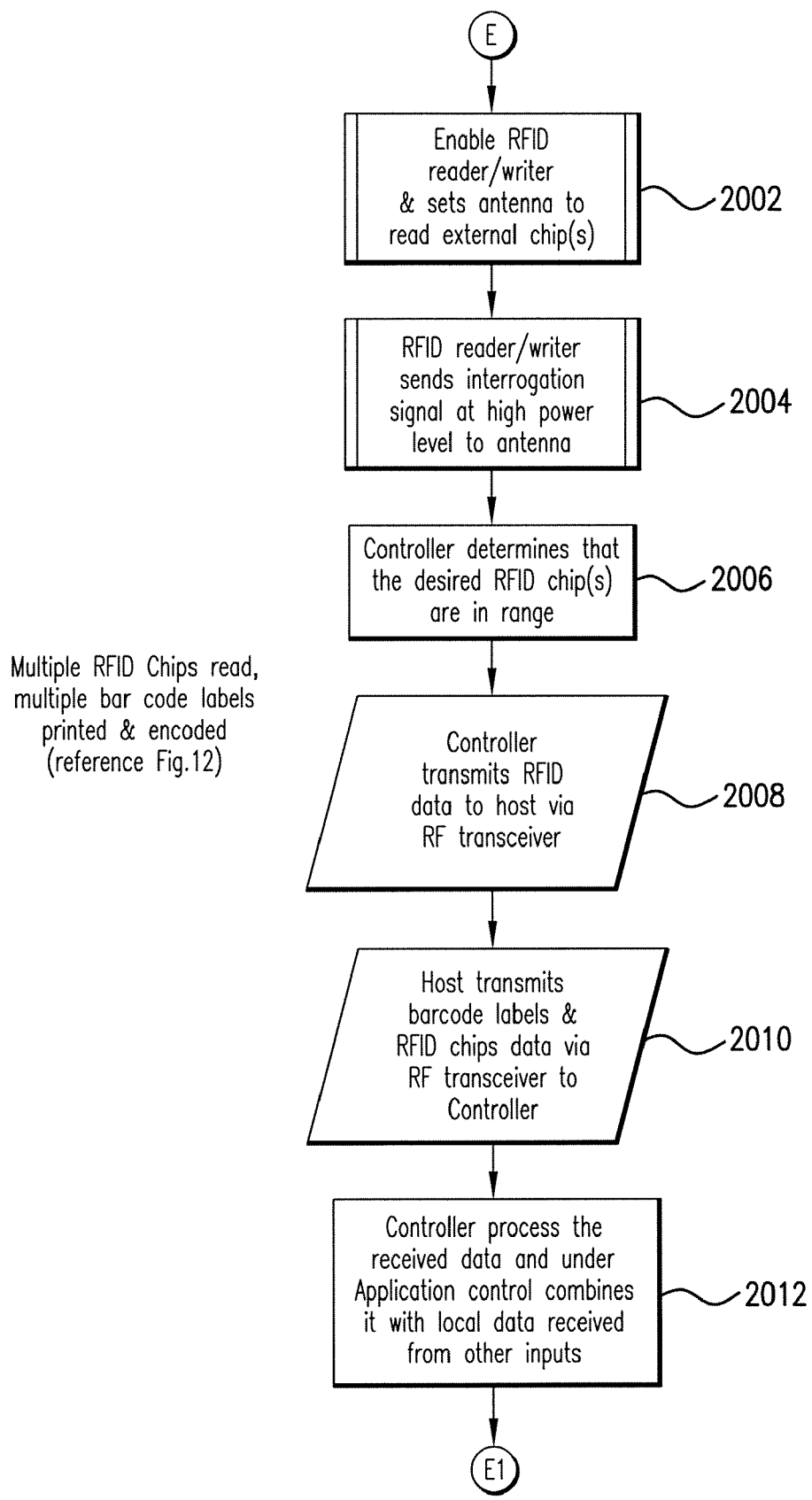
FIG. 20 is a continued flow diagram of FIG. 16-1 showing multiple RFID labels reading and multiple RFID label generator using a PC/host computer in accordance with an aspect of the invention.

In FIG. 17 at step 1720, a determination is made regarding whether a new carton label is to be printed by hand-held portable printer 110. A new carton label may be needed for a carton that may contain a plurality of items inside the carton. The carton or the plurality of items inside the carton may contain chip data. If a new carton label is determined to be required the process continues at FIG. 23 (discussed below). If a new carton label is not required then the RFID reader/writer is enabled and external antenna 115 is set to read external RFID chips as illustrated in FIG. 18 at step 1802. Next, in step 1804, RFID reader/writer sends an interrogation signal at a high energy level to external antenna 115.

RFID chips located in the field respond to the transmitted high energy level as illustrated in step 1806. Next, in step 1808 RFID reader/writer reads the data from the responding RFID chips. In step 1810, an application program being executed by the microprocessor reads in the data from the RFID reader/writer. In step 1812, it is determined if the item being searched for has been found. If the item has not been found then RFID module retransmits the interrogation signal as discussed above in step 1804. If the item has been found then in step 1812 hand-held portable printer 110 sends an interrogation signal at a low energy level to external antenna 115 for transmission at step 1814. The interrogation signal may be a conventional RFID interrogation signal. Next, in step 1902 of FIG. 19 a light beam may be turned on and directed to the located item.

In response to the interrogation signal, in step 1904 an RFID chip responds to the interrogation signal transmitted by the hand-held portable printer. The hand-held portable printer determines in step 1906 if the item has been found based on the response received from the RFID chip. The response may include RFID label data identifying products, packages, vendors, quantities, expiration dates or any other attributes of the items to which the RFID labels are affixed. If the item has been found then the hand-held portable printer displays the item number on the display in step 1908.

In step 1910, hand-held portable printer 110 processes the returned RFID label data and transmits RFID label data to host computer system via a radio or other wireless mechanism. Host computer system then associates the RFID label data to other data such as price information or any other data that may be printed on a label or used to create a barcode. In step 1912, host computer system transmits barcode label information back to printer 110. Hand-held portable printer 110 then receives and processes data in step 1914. Processing may include combining the received data with local data received from various other inputs under application control. In step 1916, hand-held portable printer 110 transmits data to its print head 120. In step 1918, the print head 120 prints a bar code label and/or a RFID label for the RFID chip that was scanned. Finally, in step 1920 the process returns to start as illustrated in FIG. 16 at step 1601.

Figure 23:
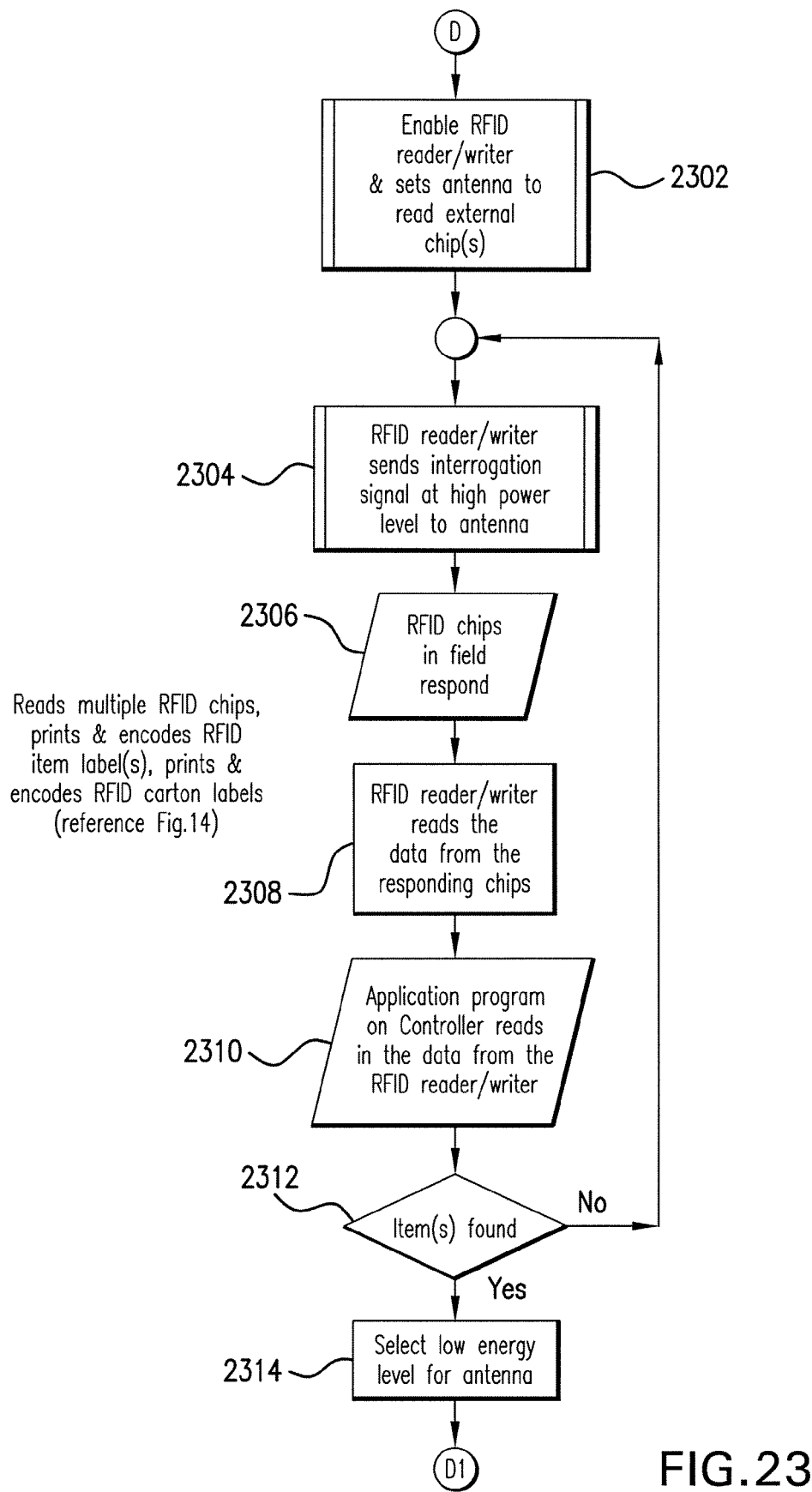
FIG. 23 is continued flow diagram of FIG. 17 showing RFID record members generated in one or both of a hand-held printer and a remote printer in accordance with an aspect of the invention.
Figure 24:
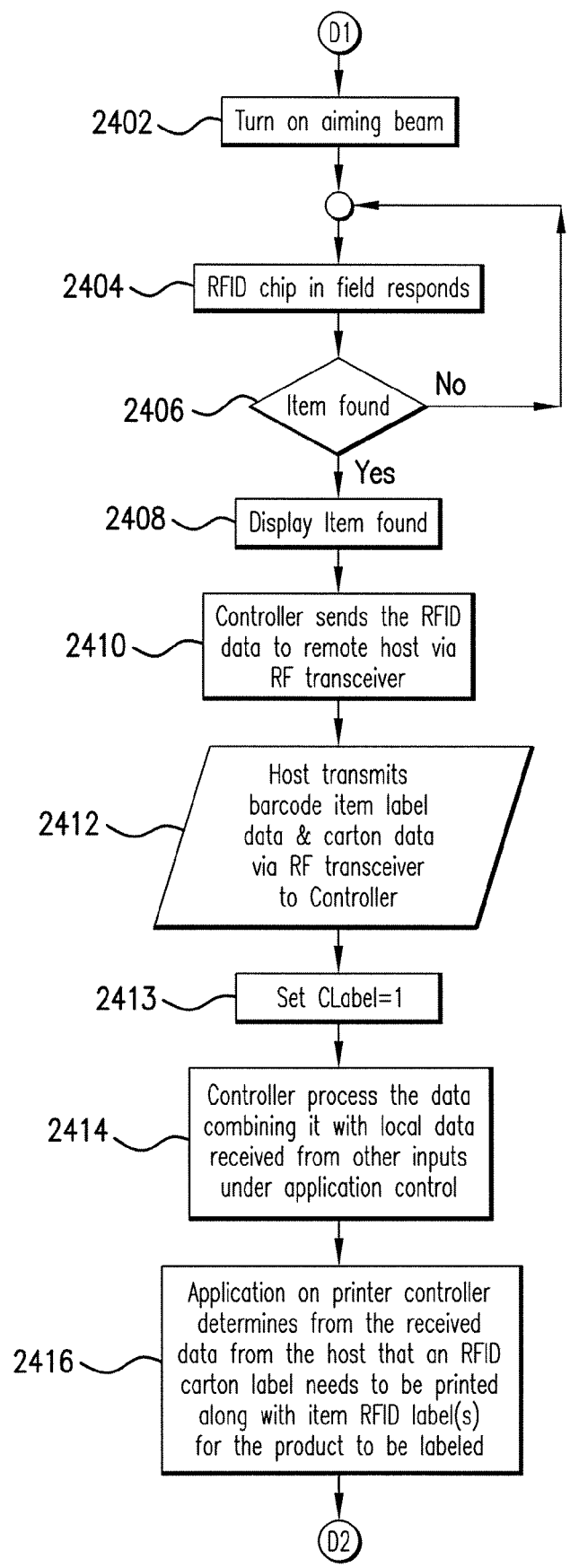
FIG. 24 is continued flow diagram of FIG. 23 showing RFID record members generated in one or both of a hand-held printer and a remote printer in accordance with an aspect of the invention.
Figure 25:
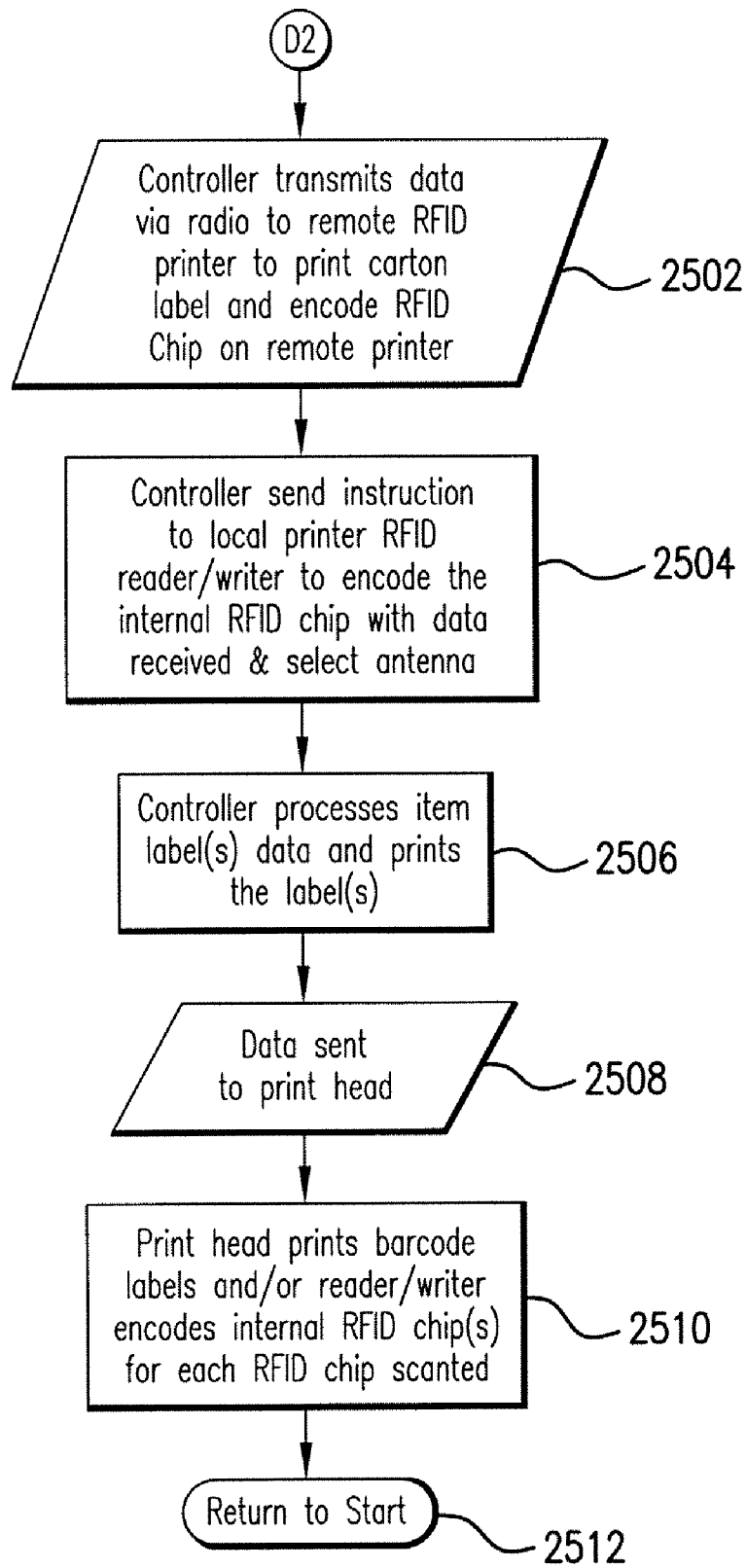
FIG. 25 is continued flow diagram of FIG. 24 showing RFID record members generated in one or both of a hand-held printer and a remote printer in accordance with an aspect of the invention.
Figure 26:
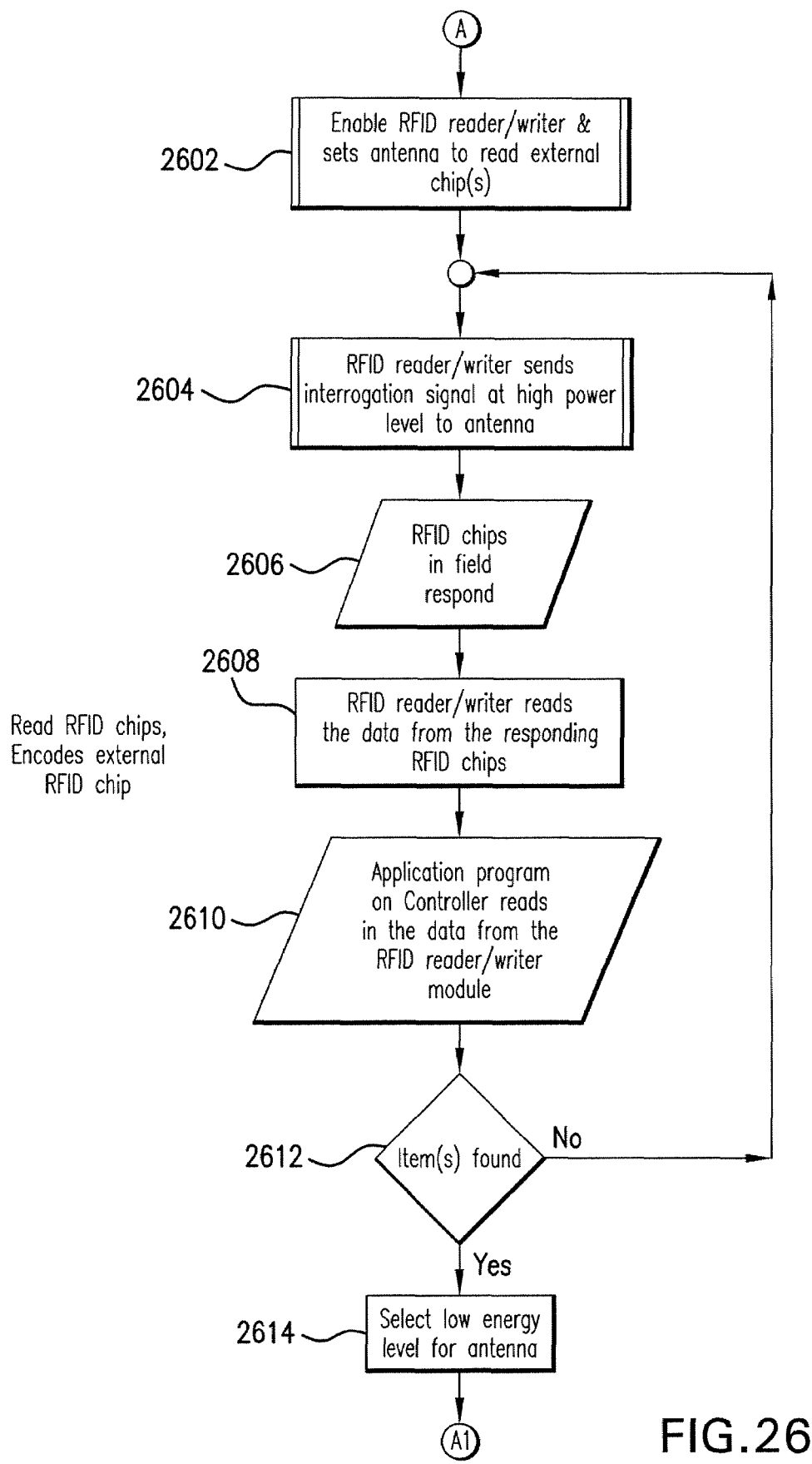
FIG. 26 is continued flow diagram of FIG. 16-1 showing encoding of external RFID chip in accordance with an aspect of the invention.
Figure 27:
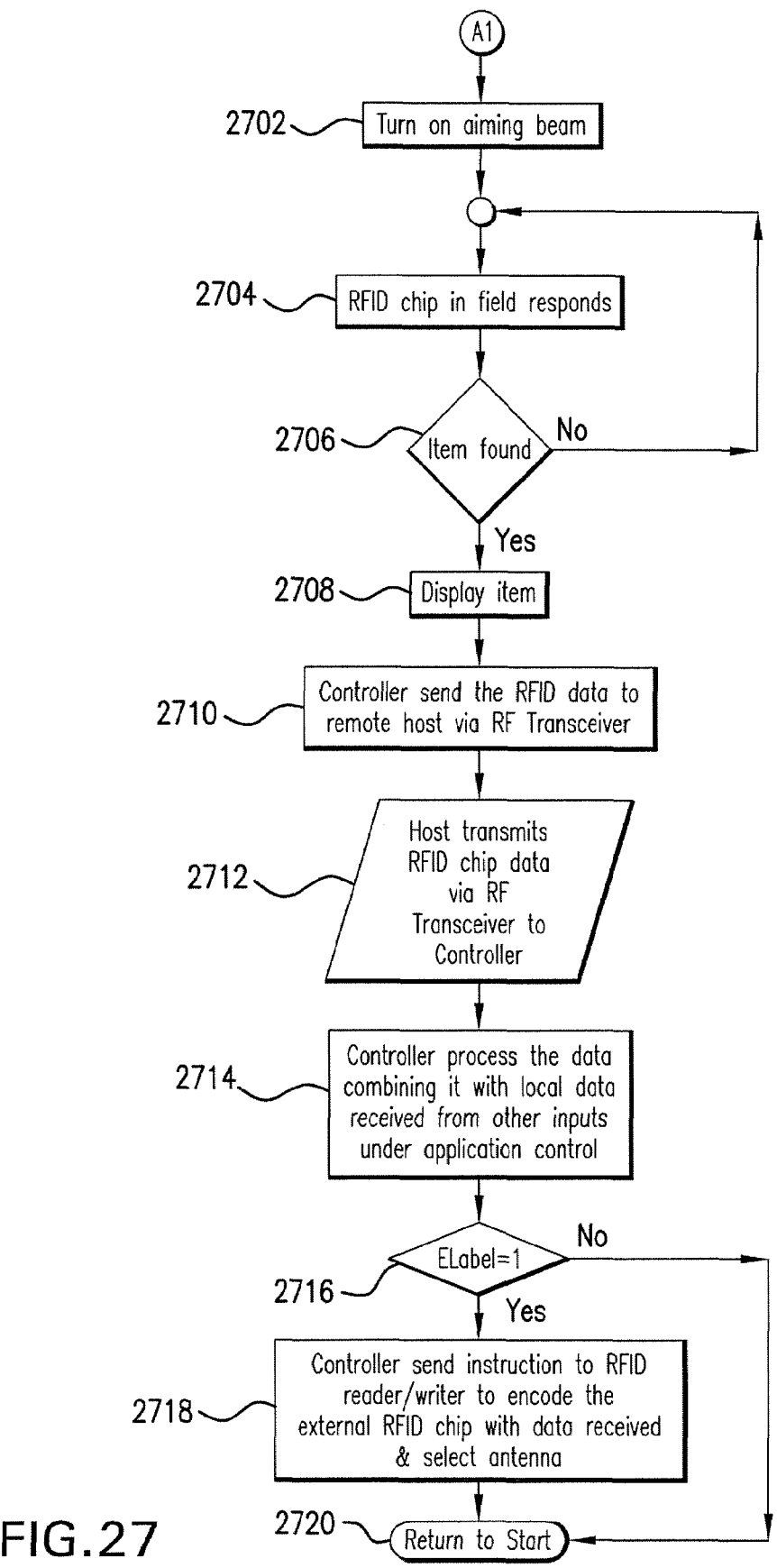
FIG. 27 is continued flow diagram of FIG. 26 showing encoding of external RFID chip in accordance with an aspect of the invention.

Returning to step 1720 of FIG. 17, if a new carton label is determined to be required the process continues at FIG. 23 at step 2302. In step 2302, the RFID reader/writer 136 is enabled and external antenna 115 is set to read external RFID chips. Next, in step 2304, RFID reader/writer sends an interrogation signal at a high energy level to external antenna 115.

RFID chips located in the field respond to the transmitted high energy level as illustrated in step 2306. Next, in step 2308 RFID reader/writer reads the data from the responding RFID chips. In step 2310, an application program being executed by the microprocessor reads in the data from the RFID reader/writer. In step 2312, it is determined if the item being searched for has been found. If the item has not been found then RFID reader/writer retransmits the interrogation signal as discussed above in step 2304. If the item has been found then in step 2314 hand-held portable printer 110 sends an interrogation signal at a low energy level to external antenna 115 for transmission. The interrogation signal may be a conventional RFID interrogation signal. Next, in step 2402 of FIG. 24 a light beam may be turned on and directed to the located item.

In response to the interrogation signal in step 2404, an RFID chip responds to the interrogation signal transmitted by the hand-held portable printer 110. The hand-held portable printer 110 determines in step 2406 if the item has been found based on the response received from the RFID chip. The response may include RFID label data identifying products, packages, vendors, quantities, expiration dates or any other attributes of the items to which the RFID labels are affixed. If the item has been found then the hand-held portable printer displays the item number on the display in step 2408.

In step 2410 hand-held portable printer 110 processes the returned RFID label data and transmits RFID label data to host computer system via a radio or other wireless mechanism. Host computer system then associates the RFID label data to other data such as price information or any other data that may be printed on a label or used to create a barcode. In step 2412, host computer system transmits barcode label information and carton data back to hand-held portable printer 110.

In step 2413, a flag for identifying that the carton data will be updated is set such as flag CLabel. Next, in step 2414 the controller of hand-held portable printer 110 processes the received data. Processing may include combining the received data with local data received from various other inputs under application control. In step 2416, a determination is made using the received data regarding whether an RFID carton label needs to be printed along with RFID labels. Next, in step 2502 of FIG. 25 the controller transmits data to a remote RFID printer to print carton labels and encode RFID chips on the remote RFID printer. The controller in step 2504 sends instructions to a local printer's RFID reader/writer to encode the internal RFID chip with data received. In addition, instructions to select an antenna are also transmitted. The controller in step 2506 processes the item labels and prints the labels.

In step 2508, hand-held portable printer 110 transmits data to the print head. In step 2510, the print head prints a bar code label and/or encodes internal RFID chips for each RFID chip that was scanned. Finally, in step 2512 the process returns to start as illustrated in FIG. 16 at step 1601.

Returning to step 1610, if a determination is made that a single label is not to be looked for among a field of labels then a determination is made whether the hand-held portable printer 110 has been instructed to print bar code labels in step 1630 (FIG. 16-1). If bar code label is not to be printed then a determination is made regarding whether to encode an external RFID label in step 1631. This step along with other related steps will be discussed in detail later in the detailed description.

If a bar code label is to be printed, a bar code flag such as BCode is set as shown in step 1632. Next, in step 1634 a determination is made regarding encoding of an internal RFID label. If an internal RFID label is to be encoded, then in step 1636 a flag such as the ILabel flag is set indicating that an internal RFID label is to be encoded. The process continues in FIG. 20 at step 2002 wherein the RFID reader/writer is enabled and external antenna 115 is set to read external RFID chips.

Next, in step 2004 RFID reader/writer sends an interrogation signal at a high energy level to external antenna 115. In step 2006, the controller determines that the desired RFID chips are in range and proceeds to step 2008 wherein the controller transmits RFID data to host computer system via a radio or other wireless mechanism. Host computer system then associates the RFID data to other data such as price information or any other data that may be printed on a label or used to create a barcode. In step 2010, host computer system transmits barcode label and RFID chip data back to hand-held portable printer 110. Hand-held portable printer 110 then receives and processes data in step 2012 via the controller. Processing may include combining the received data with local data received from various other inputs under application control.

Figure 21:
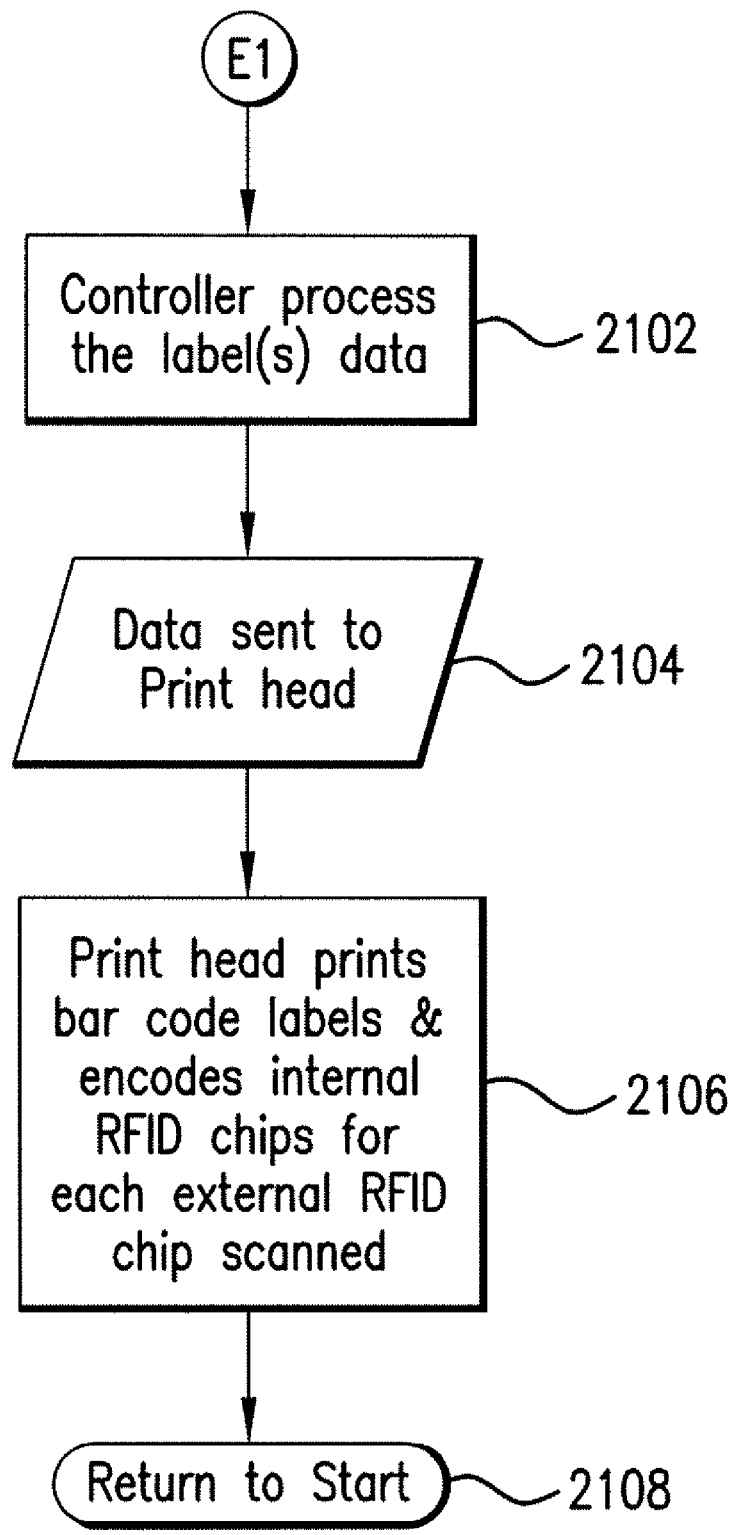
FIG. 21 is continued flow diagram of FIG. 20 showing multiple RFID labels reading and multiple RFID label generator using a PC/host computer in accordance with an aspect of the invention.
Figure 22:
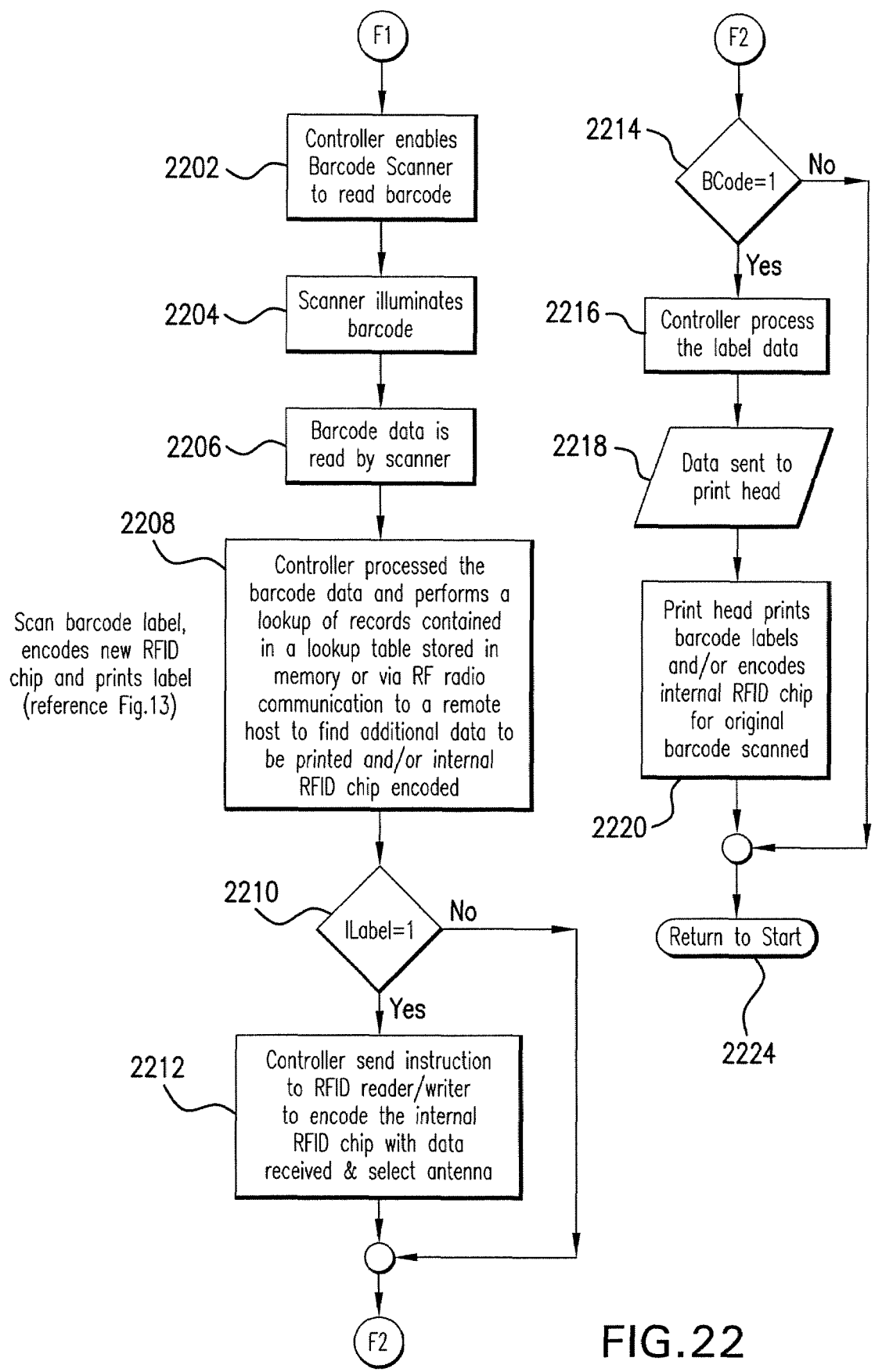
FIG. 22 is continued flow diagram of FIG. 17 showing RFID labels generated in reference to reading a barcode using the hand-held portable printer in accordance with an aspect of the invention.

In step 2102 of FIG. 21, the controller process the label data and in step 2104 transmits the data to a print head. In step 2106, the print head prints a bar code label and encodes internal RFID chips for each RFID chip that was scanned. Finally, in step 2108 the process turns to start as illustrated in FIG. 16 at step 1601.

Returning to step 1631, if a determination is made to encode an external RFID label then in step 1638 a flag such as flag ELabel is set. The process continues in FIG. 26 at step 2602 in which the RFID reader/writer is enabled and external antenna 115 is set to read external RFID chips. Next, in step 2604, RFID reader/writer sends an interrogation signal at a high energy level to external antenna 115.

RFID chips located in the field respond to the transmitted high energy level interrogation signal as illustrated in step 2606. Next, in step 2608 RFID reader/writer reads the data from the responding RFID chips. In step 2610, an application program being executed by the microprocessor reads in the data from the RFID reader/writer. In step 2612, it is determined if the item being searched for has been found. If the item has not been found then RFID reader/writer retransmits the interrogation signal as discussed above in step 2604. If the item has been found then in step 2614 hand-held portable printer 110 sends an interrogation signal at a low energy level to external antenna 115 for transmission. The interrogation signal may be a conventional RFID interrogation signal. Next, in step 2702 of FIG. 27 a light beam may be turned on and directed to the located item.

In response to the interrogation signal in step 2704, a RFID chip responds to the interrogation signal transmitted by the hand-held portable printer. The hand-held portable printer determines in step 2706 if the item has been found based on the response received from the RFID chip. The response may include RFID label data identifying products, packages, vendors, quantities, expiration dates or any other attributes of the items to which the RFID labels are affixed. If the item has been found then the hand-held portable printer displays the item number on the display in step 2708.

In step 2710, hand-held portable printer 110 transmits RFID label data to host computer system via a radio or other wireless mechanism. Host computer system then associates the RFID label data to other data such as price information or any other data that may be printed on a label or used to create a barcode. In step 2712 host computer system transmits RFID chip data back to hand-held portable printer 110. Hand-held portable printer 110 then receives and processes data in step 2714. Processing may include combining the received data with local data received from various other inputs under application control. In step 2716 the controller checks to see if the ELabel flag had been previously set. The setting of the ELabel may indicate that an external RFID chip is to be encoded. If in step 2716 it is determined that the ELabel flag has been set then in step 2718 the controller sends instructions to the RFID reader/writer to encode the external RFID chip with the data received through the selected antenna. Finally, in step 2720 the process returns to start as illustrated in FIG. 16 at step 1601.

Returning to step 1614 of FIG. 16 if hand-held portable printer 110 is to be used as bar code scanner then a series of determinations is made as illustrated in FIG. 17 at steps 1724 and 1728. In particular at step 1724, a determination is made whether the hand-held portable printer 110 has been instructed to print bar code labels. If a bar code label is not to be printed then a determination is made regarding whether to encode an external RFID label in step 1728.

If a bar code label is to be printed, a bar code flag such as BCode is set as shown in step 1726. Next, in step 1728 a determination is made regarding encoding of an internal RFID label. If an internal RFID label is to be encoded, then in step 1730 a flag such as the ILabel flag is set indicating that an internal RFID label is to be encoded. The process continues in FIG. 22 at step 2202 wherein the controller enables hand-held portable printer 110 to read bar codes. As those skilled in the art will realize, hand-held portable printer 110 may be acting as a barcode scanner to read single and/or multiple barcodes. Next, in step 2204 the hand-held portable printer 110 illuminates the barcode for scanning. In step 2206, the barcode date is read by the hand-held portable printer 110.

The process continues in step 2208 where the controller processes the barcode data and performs a lookup of records contained in a lookup table stored in memory. In an alternative aspect of the invention, the controller may communicate via a RF radio to a remote host such as a host computer system to find additional information to be printed and/or written to a RFID chip.

In step 2210, a determination is made regarding encoding of an internal RFID label. If an internal RFID label is to be encoded, then in step 2210 a flag such as the Ilabel flag is set indicating that an internal RFID label is to be encoded. The controller in step 2212 sends an instruction to RFID reader/writer to encode the internal RFID chip with data received. In addition, the controller may select internal antenna 117. Next, in step 2214 a determination is made whether the hand-held portable printer 110 has been instructed to print bar code labels. If a bar code label is to be printed then the controller in step 2216 processes the label data. The data may be sent to a print module as illustrated in step 2220. The print module may print the bar code labels and/or encode the internal RFID chip for each of the scanned barcodes. Finally, in step 2224 the process return to start as illustrated in FIG. 16 at step 1601.

Figure 28:
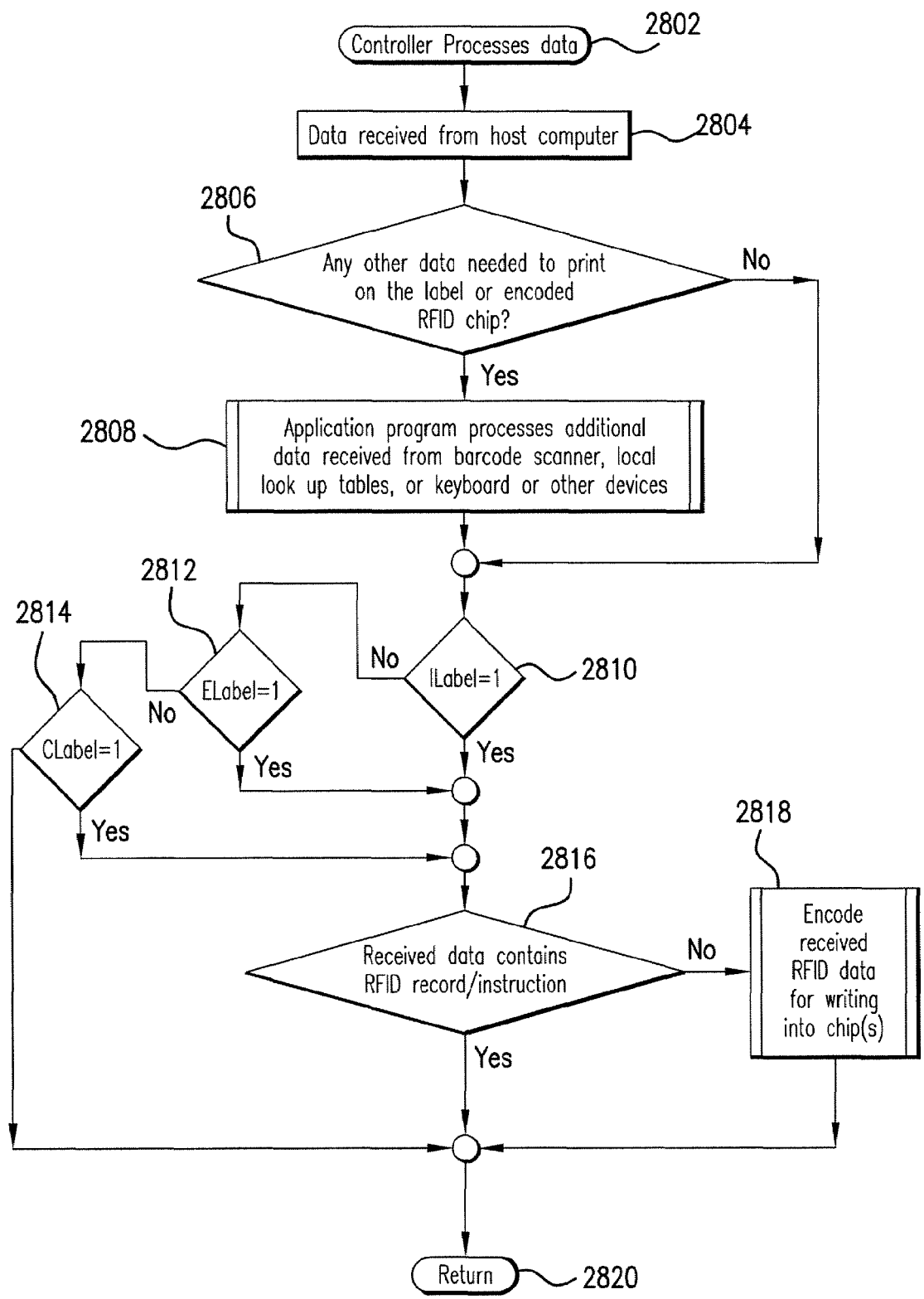
FIG. 28 is flow diagram showing a host computer system that directs the encoding of RFID chip in accordance with an aspect of the invention.
Figure 29:
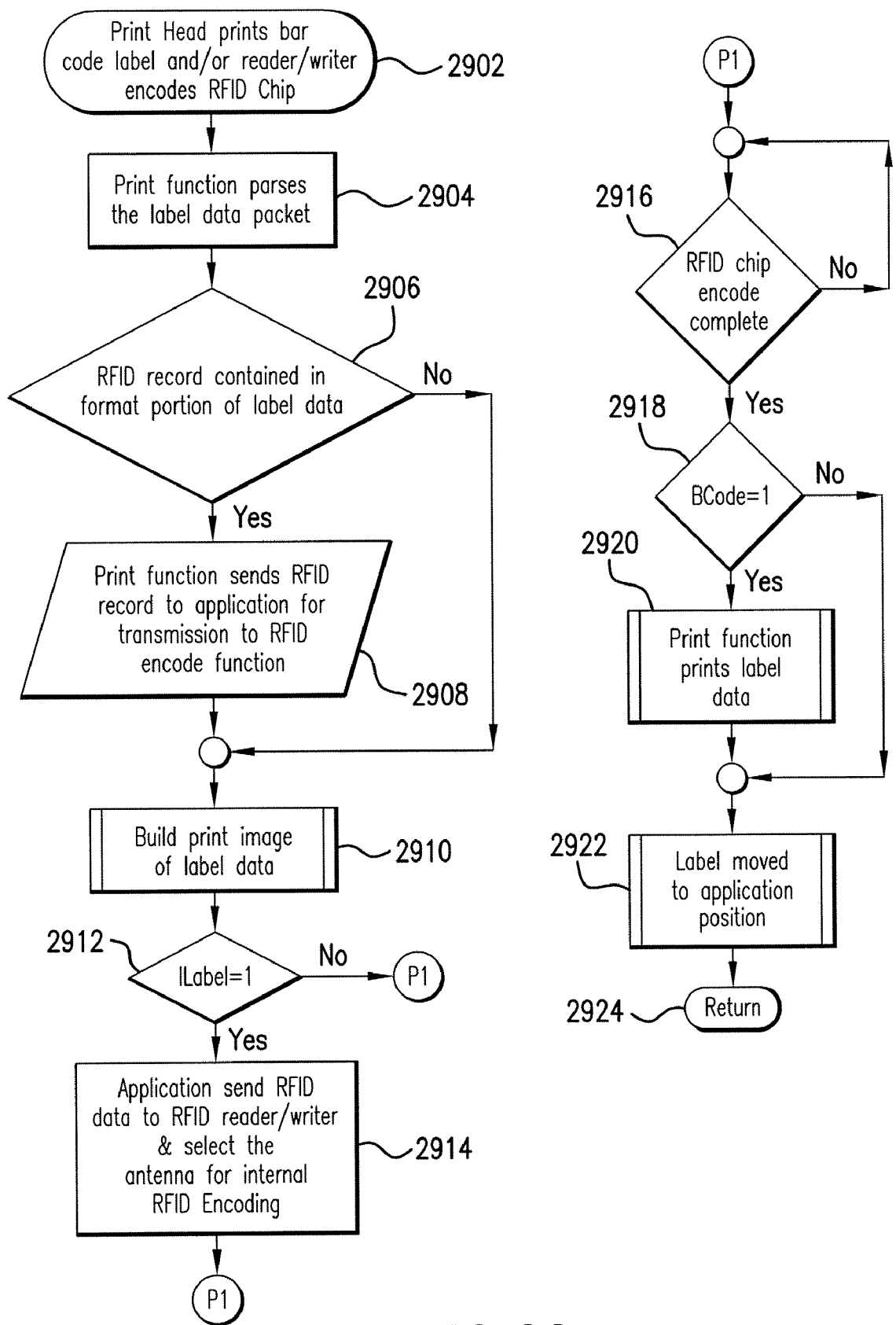
FIG. 29 is flow diagram showing print module functionality as used by the print module in accordance with an aspect of the invention.

FIG. 28 illustrates another aspect of the invention in which a host computer system may direct the encoding of RFID chips. In FIG. 28 at step 2802 a controller processes data that may be internal to the hand-held portable printer 110. Next, in step 2804 hand-held portable printer 110 receives data from a host computer system. The controller of the hand-held portable printer 110 determines in step 2806 if any additional information is needed to print a label or encode a RFID chip. If additional information in needed then in step 2808 an application program processes additional data received from various sources such as from the bar code scanner, local lookup tables or keyboard inputs from other devices.

Next, a series of determinations are made. First, in step 2810 a determination is made regarding whether an internal RFID label is to be encoded. If an internal RFID label is not to be encoded then a determination is made in step 2812 regarding whether an external RFID chip is to be encoded. If an external RFID chip is not to be encoded, then a determination is made as to whether a carton label should be printed. If a carton label is not to be printed, then the process returns in step 2820 to start as illustrated in FIG. 16 at step 1601. However, if in steps 2810, 2812, or 2814 a determination returns positive then in step 2816 a determination is made as to whether the received data contains RFID record/instructions. If the received data does not contain record/instructions, then in step 2818 RFID labels are encoded into the chips. If the received data does not contain record/instructions then in step 2820 the process returns to start as illustrated in FIG. 16.

In another aspect of the invention, print module functionality as used by the print module is described. In particular, at step 2902 of FIG. 29 the print head may print a bar code label and or encode an RFID chip. In an embodiment, the print head through use of a print function parses the label packet data in step 2904. Next, in step 2906 a determination is made regarding whether the parsed label data includes an RFID record. If the label data contains a RFID record then in step 2908 the print function sends the RFID record to an application for transmission by a reader/writer for encoding. Next, in step 2910 a print image is built of the label data to be printed.

A determination is made in step 2912 regarding status of the ILabel flag. If the ILabel flag has been set, then in step 2912 the application sends the RFID data to the RFID reader/writer. In addition, antenna 117 may be selected for internal encoding. Next, in step 2916 the process waits until the RFID chip has been encoded. When the RFID chip has been encoded a determination is made as to whether a bar code label needs to be printed. In particular, in step 2918 the process determines if the BCode flag has been set. If the BCode flag has been set then in step 2920 the print function prints the label data. The label is moved to the application position in step 2922 and the process returns in step 2924 to start in FIG. 16 at step 1601.

The invention has been described in terms of exemplary embodiments. Numerous other embodiments, modifications and variations within the scope and spirit of the appended claims will occur to persons of ordinary skill in the art from a review of this disclosure.

We claim:

1. A hand-held portable printer, comprising:
    a hand-held housing;
    a plurality of input devices on the housing for receiving data including a barcode scanner and a plurality of keys actuable by a user to provide a plurality of input sources;
    a communication interface;
    an RFID reader/writer;
    an antenna coupled to and cooperating with the RFID reader/writer to read and/or write to an RFID chip external to the housing;
    a printing system having a printhead and a drive mechanism to drive a web of RFID record members past the printhead for printing data thereon;
    another antenna coupled to and cooperating with the RFID reader/writer to read and/or write to an RFID chip on the web of record members; and
    a processor on the housing, the processor being coupled to the printing system and to the RFID reader/writer and operable to select data from the plurality of input sources to print on the web and/or to write to an RFID chip on the web.

2. A hand-held portable printer as recited in claim 1, including a memory for storing an application program according to which the processor operates, the application program determining the data selected for printing and the data selected for writing by the RFID reader/writer.

3. A hand-held portable printer as recited in claim 1, including a memory for storing data received from the plurality of the input devices in association with a transaction in a transaction record; the processor sending the transaction record to a host via the communication interface.

4. A hand-held portable printer, comprising:
a hand-held housing;
a radio transceiver on the housing for receiving and transmitting data;
a barcode mounted on the housing for providing scanned barcode data;
a printing system on the housing including a printhead and drive mechanism to drive a web of RFID record members past the printhead for printing data on the record members;
an RFID reader/writer on the housing;
a first antenna coupled to the RFID reader/writer and capable of reading and/or writing to an RFID chip on the web of record members;
a second antenna coupled to the RFID reader/writer and capable of reading and/or writing to an RFID chip external to the housing, the RFID reader/writer in accordance with a read operation reading data from an external RFID chip, and the RFID reader/writer in accordance with a write operation writing data to an external RFID chip;
a plurality of keys on the housing to provide user inputs to the printer;
a memory for storing an application program;
a processor on the housing operable in accordance with an application program to take data input from one or more of the radio transceiver, the keys, and the barcode scanner to selectively couple data to the printing system for printing, the RFID reader/writer for writing to an RFID chip and/or the transceiver for transmitting the data.

5. A hand-held portable printer, comprising:
a hand-held housing;
a plurality of input devices on the housing for receiving inputs including a bar code scanner, a plurality of keys actuable by a user and a communication interface;
a first antenna;
a second antenna;
an RFID reader/writer on the housing and coupled to the first antenna and the second antenna, the RFID reader/writer being capable of reading and/or writing via the first antenna to an RFID chip in the web of record members, and the RFID reader/writer being capable of reading and/or writing via the second antenna to an external RFID chip;
a printing system on the housing having a printhead and a drive mechanism to drive a web of RFID record members past the printhead to print data on the record members; and
a processor on the housing, the processor being coupled to the printing system and to the RFID reader/writer and operable to select data from one or more of the plurality of input devices to print on the web and/or write to an RFID chip on the web.

6. A hand-held portable printer comprising:
a hand-held housing;
a plurality of output devices on the housing including a display, a printhead and a drive mechanism to drive a web of RFID record members past the print head for printing data thereon;
antennas for reading and/or writing to RFID chips inside and outside the portable housing, an RFID read/write module on the housing;
an RFID reader/writer coupled to the antennas;
a memory storing an application program; and
a processor for processing input data in accordance with the application program, and the processor selectively coupling processed data to one or more of the output devices and the RFID reader/writer.

7. A hand-held portable printer, comprising:
a hand-held housing having a handle;
a barcode scanner on the housing;
a communication interface on the housing to allow communication with a host;
a printing system having a print head and a drive mechanism to drive a web of RFID record members past the print head for printing data thereon;
a first antenna;
a second antenna;
an RFID reader/writer on the housing and coupled to the first antenna and the second antenna, the RFID reader/writer being capable of reading from and writing to via the first antenna an RFID chip on the web of record members and reading from and writing to via the second antenna an external RFID chip;
a display mounted on the housing;
a memory mounted in the housing storing an application program; and
a processor mounted on the housing for processing data received by the barcode scanner, the communication interface and/or RFID reader/writer in a read mode and providing data to the communication interface, the RFID reader/writer and/or display in accordance with the stored application program.

8. A hand-held portable printer, comprising:
a hand-held housing;
a print head on the housing, the print head being capable of printing on a web of RFID record members in the housing;
an RFID reader/writer in the housing that generates read and/or write signals;
antennas coupled to the RFID reader/writer;
the antennas enabling the RFID reader/writer to read and/or write to RFID chips in the record members and enabling RFID chips external to the housing to be read and/or written to.

9. The hand-held portable printer of claim 8,
wherein the antennas include an antenna outside the housing and an antenna inside the housing;
wherein the antennas are electromagnetically isolated from each other.

10. The printer of claim 8,
wherein the antennas include an antenna inside the housing cooperable with an RFID chip-containing web upstream of the print head.

11. The printer of claim 8,
wherein the housing includes a handle;
wherein the antennas include an antenna outside the housing disposed forward of the handle.

12. The hand-held portable printer of claim 8, further including
a barcode scanner on the housing; and
the antennas including an antenna capable to transmitting and receiving data signals to and from an RFID chip located external to the housing, the scanner being capable of producing a beam by which to aim the antenna that reads and/or writes to the external RFID chip.

13. The hand-held portable printer of claim 8, wherein the RFID reader/writer is configured to produce radio frequency signals at a plurality of energy levels.

14. A hand-held portable printer, comprising:
a hand-held housing capable of holding a supply roll of a web of RFID labels containing RFID chips;
a print head disposed on the housing to print on the RFID labels;
an RFID reader/writer on the housing;
a first RFID antenna coupled to the RFID reader/writer and disposed along a web path upstream of the print head;
a second RFID antenna coupled to the RFID reader/writer and operable to read and/or write to an RFID chip external to the housing; and
a controller coupled to the RFID reader/writer to read an RFID chip external to the housing and in response thereto writing to an RFID chip on the labels.

15. The hand-held portable printer of claim 14,
wherein the housing includes shielding, wherein the shielding helps electromagnetically isolate the first antenna and the second antenna from each other.

16. The hand-held portable printer of claim 14, including a beam source to aim the printer at an external RFID chip.

17. A method of printing, comprising the steps of:
providing a hand-held printer capable of printing on RFID labels on a label web in the printer;
receiving a read command from a user, the read command indicating whether the read is for a single RFID chip or multiple RFID chips located external to the printer;
when the read command is for a single RFID chip, generating an RFID read signal having a first energy level and reading data from the RFID chip external to the printer;
when the read command is for multiple RFID chips, generating an RFID read signal having a second energy level that is higher than the first energy level and reading data from the RFID chips external to the printer; and
printing data on the labels and writing to the RFID chips on the labels in response to the received data.

18. A hand-held portable printer, comprising:
a hand-held housing;
a printing system on the housing and including a print head and a drive mechanism to drive a web of RFID labels past the print head for printing data on the RFID labels;
an internal antenna on the housing and configured to communicate with an RFID chip on the RFID labels;
an external antenna on the housing, the external antenna configured to communicate with an RFID chip located external to the housing; and
an RFID reader/writer on the housing and coupled to the internal antenna and the external antenna, the RFID reader/writer in accordance with a read operation receiving data from at least one of the internal antenna and the external antenna and in accordance with a write operation providing data to at least one of the internal antenna and the external antenna.

19. The hand-held portable printer of claim 18, including:
a mounting member to mount the external antenna to the housing.

20. The hand-held portable printer of claim 19, wherein the mounting member is relatively movably mounted to the housing.

21. The hand-held portable printer of claim 19, wherein the mounting member is pivotal between a first position and a second position, and wherein the second position is a position away from the housing.

22. The hand-held portable printer of claim 21, wherein the external antenna when pivoted to the second position facilitates threading of a carrier web for the labels.

23. The hand-held portable printer of claim 19, further including a laser-emitting device that generates a laser beam in the direction of an electromagnetic field produced by the external antenna.

24. A method of printing labels, comprising the steps of:
providing a hand-held label printer including a hand-held housing, a print head, a barcode scanner and an RFID reader/writer on the housing;
reading barcode data from a barcoded label and/or from an RFID chip external to the housing;
transmitting to a remote host computer at least a portion of the data;
associating data received from the computer and the bar code scanner or the RFID reader/writer;
writing to an RFID chip on a label in the hand-held label printer; and
printing on the label in the hand-held printer.

25. A method of printing labels, comprising the steps of:
providing a hand-held portable printer including a hand-held housing, a print head on the housing to print on a web of RFID record members, and an RFID reader/writer to read and/or write to an RFID chip on the record members on the hand-held printer;
providing a remote printer located remotely from the hand-held portable printer, the remote printer having a print head to print on a web of RFID record members and an RFID reader/writer to read and/or write to an RFID chip on record members in the remote printer;
reading data from a barcoded label and/or from an RFID chip external to the hand-held portable printer;
transmitting wirelessly to a host computer at least a portion of the data;
associating data received wirelessly from the host computer and the bar code scanner and/or the RFID reader/writer at the hand-held portable printer;
and selectively writing to an RFID chip in one or both of the hand-held printer and the remote printer.

26. A hand-held label printer, comprising:
a hand-held housing having space for an RFID label web containing RFID chips;
a print head on the housing capable of printing bar codes on RFID labels on the web;
a barcode scanner on the housing;
an RFID reader/writer on the housing;
a first antenna on the housing coupled to the RFID reader/writer to write to an RFID chip on the label web;
a second RFID antenna on the housing coupled to the RFID reader/writer, the housing being manually movable to enable the second antenna to capture RFID data from an RFID chip external to the housing;
a controller coupled to the printing system and the RFID reader/writer and capable of either one or both of the following sequences:
controlling data acquired via the second antenna to print a barcode and to write to and/or read from the RFID chip on the web via the first antenna; and
controlling data acquired via the bar code scanner and/or wirelessly from a host computer to print a bar code and to write to and/or read from an RFID chip on the label web via the first antenna.

27. A method of encoding labels comprising the steps of:
(a) receiving a read command at a hand-held portable printer including a housing, a barcode, scanner, and an RFID reader/writer on the housing that generates read and/or write signals;
(b) in response to (a) reading RFID chip external data from at least one RFID chip located outside of the housing;
(c) transmitting to a remote host computer system at least a portion of the read RFID chip external data;
(d) associating additional data received from the host computer system with the read RFID chip external data to form updated data; and
(e) writing the updated data to an internal RFID chip.

28. A hand-held label printer, comprising:
a hand-held housing;
a print head on the hand-held housing capable of printing RFID labels;
a barcode scanner on the hand-held housing;
an RFID reader/writer on the housing;
a radio; and
a controller coupled to the RFID reader/writer and capable of performing the steps of:
  (a) reading data from an RFID chip external to the hand-held housing;
  (b) transmitting to a remote host computer at least a portion of the read data;
  (c) associating data received from the host computer; and
  (d) writing to an external RFID chip.

29. A hand-held label printer comprising:
a hand-held housing;
a print head on the hand-held housing capable of printing on a web of RFID record members;
a barcode scanner on the hand-held housing;
an RFID reader/writer on the housing;
a radio; and
a controller coupled to the RFID reader/writer and capable of performing the steps of:
  (a) reading data from a barcoded label and/or from an RFID chip external to the hand-held printer;
  (b) transmitting wirelessly to a host computer at least a portion of the data;
  (c) receiving from the host computer associated data; and
  (d) selectively writing to an RFID chip.

30. A hand-held label printer comprising:
a hand-held housing;
a print head on the hand-held housing capable of printing on a web of RFID record members;
a barcode scanner on the hand-held housing;
an RFID reader/writer on the housing;
a radio; and
a controller coupled to the RFID reader/writer and capable of performing the steps of:
  (a) receiving a read command;
  (b) in response to (a) reading RFID chip external data from at least one RFID chip located outside of the hand-held housing;
  (c) transmitting to a remote host computer system at least a portion of the read RFID chip external data;
  (d) associating additional data received from the host computer system with the read RFID chip external data to form updated data; and
  (e) writing the updated data to an internal RFID chip.

31. A method of encoding labels, comprising:
(a) receiving a read command at a hand-held portable printer including a housing, a print head to print on RFID labels, a bar code scanner, and an RFID reader/writer on the housing that generates read and/or write signals to read and/or write to RFID labels;
(b) in response to (a) reading RFID chip data from at least one RFID chip located external to the housing;
(c) associating additional data with the read RFID chip external data to form updated data; and
(d) encoding one or more labels by printing on the label(s) with the print head and writing to the label(s) with the RFID reader/writer.

32. Method of encoding labels as defined in claim 31,
wherein the chip data is on a carton;
there is a plurality of items inside the carton;
a plurality of labels are encoded; and
applying the encoded labels to the items.

33. Methods of encoding labels as defined in claim 31,
wherein the chip data is on an item or a carton, and
applying an encoded labels to a shelf.

34. Method of encoding labels, comprising:
(a) providing a hand-held portable printer including a housing, a bar code scanner on the housing, a print head to print on RFID labels in the housing and an RFID reader/writer on the housing that generates read and/or write signals to read and in write to the RFID labels;
(b) reading RFID chip data from at least one RFID chip located external to the housing;
(c) associating additional data with the read RFID chip external data to form updated data;
(d) disabling the external RFID chip; and
(e) encoding one or more labels by printing on the label(s) with the print head and writing to the labels with the RFID reader/writer.

35. The method of claim 34, wherein the chip in (b) is disposed on a carton, and the encoded label(s) is applied to the carton and/or its contents.

36. A system for printing labels, the system comprising:
a hand-held portable printer including a hand-held housing, a print head on the housing to print on a web of RFID record members, and an RFID reader/writer to read and/or write to an RFID chip on the record members on the hand-held printer, the RFID reader/writer of the hand-held portable printer being capable of reading data from an RFID chip external to the printer;
a host computer in communication with the hand-held portable printer, the host computer receiving at least a portion of the data read from the external RFID chip, the host computer having additional information relating to the received data; and
a remote printer located remotely from the hand-held portable printer and the host computer, the remote printer having a print head to print on a web of RFID record members and an RFID reader/writer to read and/or write to an RFID chip on record members in the remote printer, the remote printer selectively writing to an RFID chip.

37. A method of printing, the method comprising:
(a) displaying a selection menu on a hand-held portable printer capable of printing on labels;
(b) receiving a selection, the selection including a read command;
(c) receiving a trigger indication;
(d) determining based on the received read command whether the read is for a single RFID chip or a plurality of RFID chips located outside of the hand-held portable printer;

(e) when the read command is for the single RFID chip,
  (i) determining whether to print a bar code label;
  (ii) determining whether to encode an internal label;
  (iii) generating an RFID read signal having a first energy level; and
  (iv) printing data on the internal label;
(f) when the read command is for said plurality of RFID chips,
  (i) determining whether to print a bar code label;
  (ii) determining whether to encode an internal label;
  (iii) determining whether to print a new carton label;
  (iv) generating an RFID read signal having a second energy level that is greater than the first energy level; and
  (v) printing data on internal labels.

38. The method of claim 37, wherein step (i) further comprises setting a BCode flag if it is determined to print a bar code label.

39. The method of claim 37, wherein step (ii) further comprises setting an ILabel flag if it is determined to encode an internal RFID label.

40. The method of claim 37, wherein, step (f) (iii) further comprises setting an ELabel flag if it is determined to print the new carton label.

41. A method of printing labels, the method comprising:
(a) displaying a selection menu;
(b) receiving a selection based on the displayed menu; the selection including a write command;
(c) receiving a trigger indication;
(d) determining whether the received write command is for a single write of an RFID chip or for multiple writes of RFID chips;
(e) when the write command is for a single RFID chip; generating at an external antenna an RFID write signal having a low power level;
(f) when the write command is for multiple RFID chips; generating at an external antenna an RFID write signal having a high power level; and
(g) printing data on the labels and writing from an internal antenna to the RFID chips on the labels in response to the received data.

42. A computer-readable medium containing computer-executable instructions for causing a hand-held portable RFID printer to perform the steps comprising:
(a) receiving a read command from a user, the read command indicating whether the read is for a single RFID chip or a plurality of RFID chips located outside of the hand-held portable RFID printer;
(b) when the read command is for said single RFID chip, generating an RFID read signal having a first energy level;
(c) when the read command is for said plurality of RFID chips, generating an RFID read signal having a second energy level that is greater than the first energy level; and
(d) printing data on a label in the printer and reading from and/or writing to an RFID chip on the label.

* * * * *